United States Patent
Tanaka et al.

[19]

[11] Patent Number: 6,108,102

[45] Date of Patent: Aug. 22, 2000

[54] IMAGE PROCESSING METHOD AND APPARATUS, AND IMAGE FORMING APPARATUS

[75] Inventors: Hideki Tanaka, Yokohama; Hiroyuki Hyotani, Kawasaki, both of Japan

[73] Assignee: Canon Kabushiki Kaisha, Tokyo, Japan

[21] Appl. No.: 09/012,600

[22] Filed: Jan. 23, 1998

[30] Foreign Application Priority Data

Jan. 27, 1997 [JP] Japan .................................... 9-013007
Jan. 20, 1998 [JP] Japan ................................. 10-009066

[51] Int. Cl.⁷ ................................................. G06K 15/00
[52] U.S. Cl. .......................................... 358/1.9; 358/1.16
[58] Field of Search ..................................... 347/5, 10, 37; 358/502, 504, 518, 521, 523, 524, 530, 536, 539, 404, 406, 409, 410, 444, 443, 447, 448, 455, 456, 457, 458, 460; 345/101, 102, 109, 108, 112, 115, 117; 382/299; 400/279, 320

[56] References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 R |
| 4,437,122 | 3/1984 | Walsh et al. | 358/166 |
| 4,459,600 | 7/1984 | Sato et al. | 346/140 R |
| 4,463,359 | 7/1984 | Ayata et al. | 346/1.1 |
| 4,558,333 | 12/1985 | Sugitani | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,294,996 | 3/1994 | Sobue | 358/298 |
| 5,687,296 | 11/1997 | Shimada | 395/102 |
| 5,764,378 | 6/1998 | Oda et al. | 358/448 |
| 5,778,159 | 7/1998 | Ito | 395/109 |

FOREIGN PATENT DOCUMENTS

| | | | |
|---|---|---|---|
| 0509685 | 10/1992 | European Pat. Off. | G06K 15/00 |
| 54-056847 | 5/1979 | Japan | B41M 5/26 |
| 59-123670 | 7/1984 | Japan | B41J 33/04 |
| 59-138461 | 8/1984 | Japan | B41J 3/04 |
| 60-071260 | 4/1985 | Japan | B41J 3/04 |
| 06187405 | 7/1994 | Japan | G06F 15/62 |
| 07235878 | 9/1995 | Japan | H03M 7/42 |

*Primary Examiner*—Arthur G. Evans
*Attorney, Agent, or Firm*—Fitzpatrick, Cella, Harper & Scinto

[57] ABSTRACT

An image processing and image forming system inputs multivalued image data having a resolution of 300×300 dpi, converts the resolution of the data to a higher resolution of 600×1200 dpi and forms an image. In a memory, pattern data corresponding to image data of a predetermined color is stored in advance. When color data, image data (code) and data corresponding to an image forming position are input to the memory as an address, the memory outputs pattern data stored at that address. By selectively outputting the pattern data read from the memory in accordance with the forming position, color image data whose resolution has been converted is output to form an image.

25 Claims, 16 Drawing Sheets

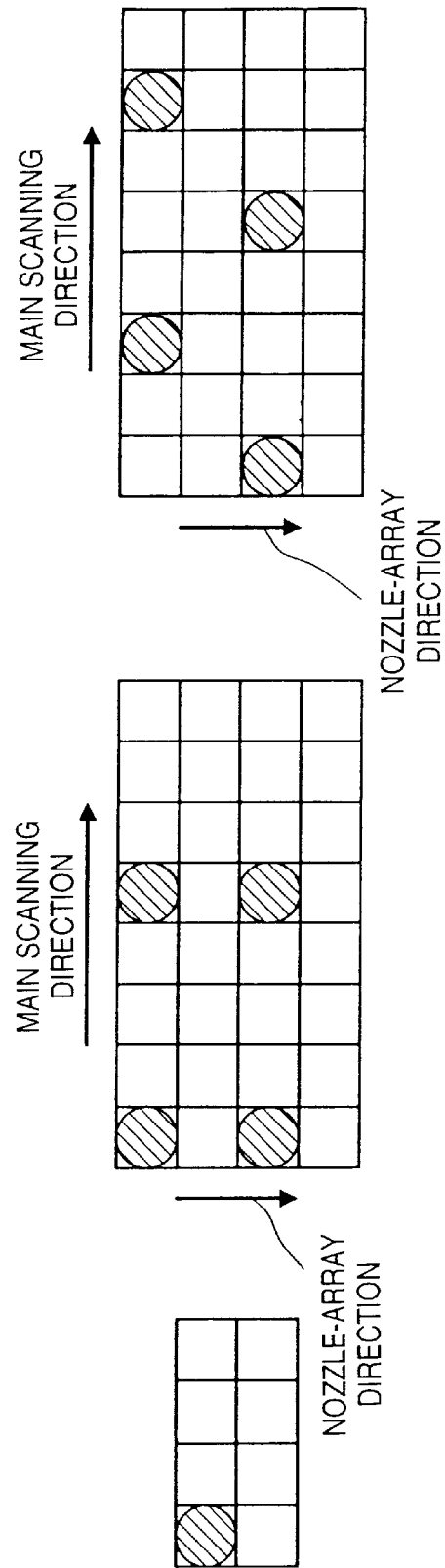

IMAGE PROCESSING METHOD AND APPARATUS, AND IMAGE FORMING APPARATUS

BACKGROUND OF THE INVENTION

The present invention relates to an image processing method and apparatus for performing processing on inputted image data and generating data to be used by an output apparatus, and an image forming apparatus for processing inputted image data and forming an image based on the processed image data.

As the resolution capability of a display apparatus or a recording apparatus has improved in recent years, a large number of apparatuses having resolution capability superior to resolution of image data used in a host computer have been developed.

For a circuit which reads and writes such high-resolution image data at high speed, for instance, a graphic processor disclosed in Japanese Patent Publication No. 7-109550 or No. 7-109549 has been suggested. These publications disclose, for instance, a structure for reading multivalued data, representing one pixel by 4 bits of data, out of a memory and outputting the data in accordance with a display position where the pixel is displayed, and also a structure for performing logical operations on the image data to be outputted based on mask data and color data stored in a mask register.

However, the foregoing conventional technique does not take into account converting resolution of image data, from 300×300 dpi used by e.g. a host computer or the like, to 600×1200 dpi used by an image output apparatus having a higher resolution capability. Moreover, performing resolution conversion on inputted image data and generating binary data (i.e. binary data having a resolution of 600×1200 dpi) where one bit of the converted image data corresponds to one nozzle of a printhead, are conventionally executed by software. When such processing is performed by software, a large load is added to the host computer executing the software. Furthermore, in a case where such high-resolution data is transferred from a host computer to an image output apparatus, the time required to transfer the data between the host computer and image output apparatus is about twice as long as a case of transferring multivalued data having resolution of 300×300 dpi where 4 bits represent 1 pixel.

Note that in order to reduce the data transfer time between the host computer and image output apparatus, it has been suggested to transfer the image data having a resolution of 300 dpi without being processed from the host computer to the image output apparatus, and have the image output apparatus perform resolution conversion suitable to the apparatus for outputting an image. However, in this case, the image output apparatus temporarily stores the received data in a RAM and performs resolution conversion, or performs resolution conversion by dedicated hardware. Although the data transfer time is reduced by this method, the time required for resolution conversion is increased; and as a result, throughput declines. Moreover, even if dedicated hardware is provided in the image output apparatus, it is problematic in that the memory capacity of the RAM must be increased.

SUMMARY OF THE INVENTION

The present invention has been made in consideration of the above situation, and has as its object to provide an image processing method and apparatus having a simple structure, capable of converting, in real time, inputted image data into a data form which can be outputted by an output apparatus, and an image forming apparatus having this function.

Another object of the present invention is to provide an image processing method and apparatus capable of converting, in real time, inputted multivalued data to binary data which can be outputted by an output apparatus and outputting the converted data, and an image forming apparatus having this function.

Furthermore, another object of the present invention is to provide an image processing method and apparatus for storing inputted multivalued data, shifting the stored multivalued data in synchronization with a shift clock, generating converted data in accordance with the multivalued data and storing each bit of the converted data in accordance with an output position where the data is outputted by an output apparatus in accordance with a count value of the shift clock.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 12A to 12C show comparison examples comparing the process performed by the drive data transfer circuit according to the second embodiment with the process performed by the drive data transfer circuit according to the first embodiment;

DETAILED DESCRIPTION OF THE PREFERRED EMBODIMENTS

Preferred embodiments of the present invention will be described in detail in accordance with the accompanying drawings.

First Embodiment

Figure 1:
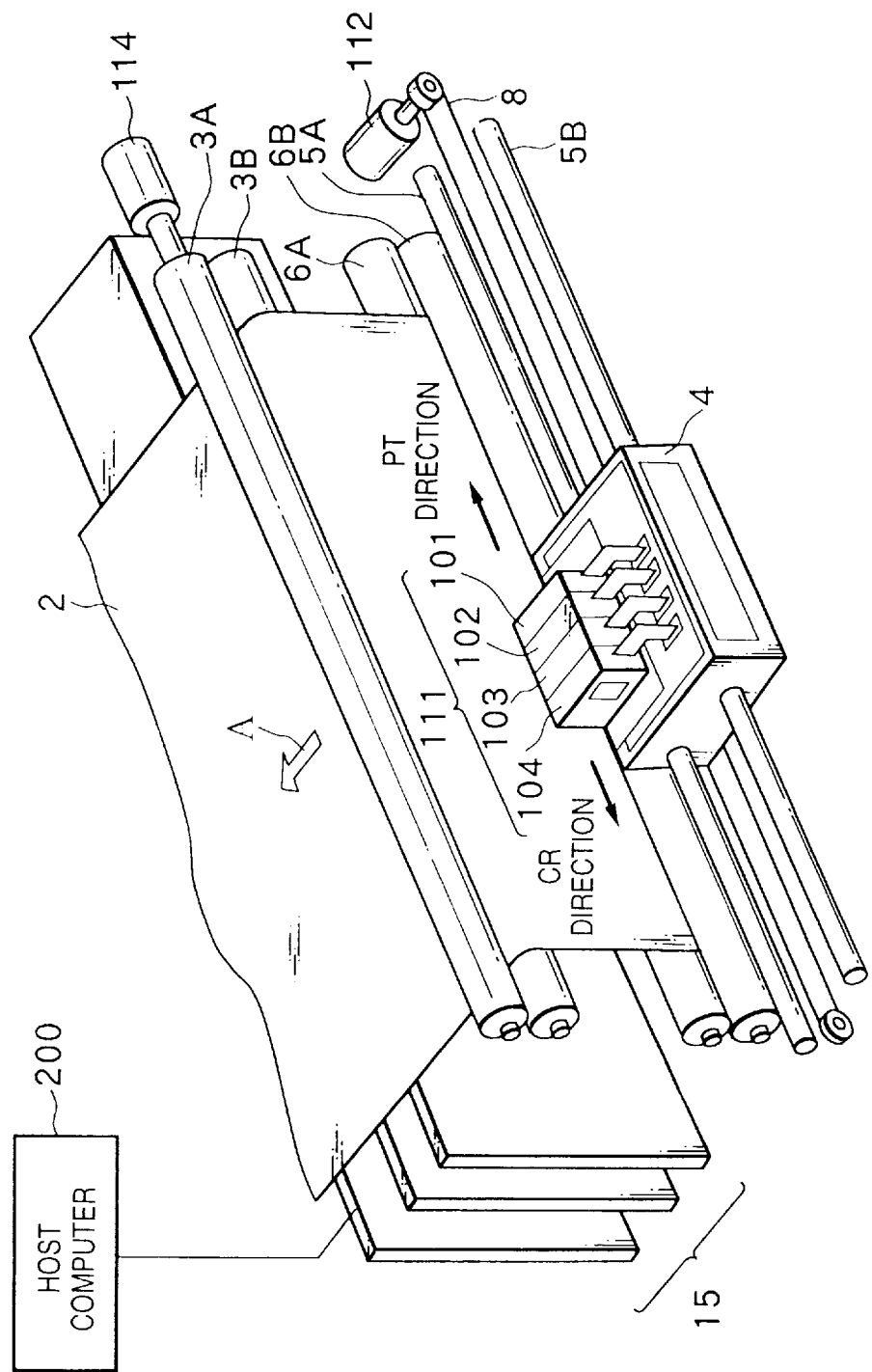
FIG. 1 is a perspective view showing an external appearance of the overall structure of a printing unit of a color ink-jet printer according to the present embodiment.
Figure 2:
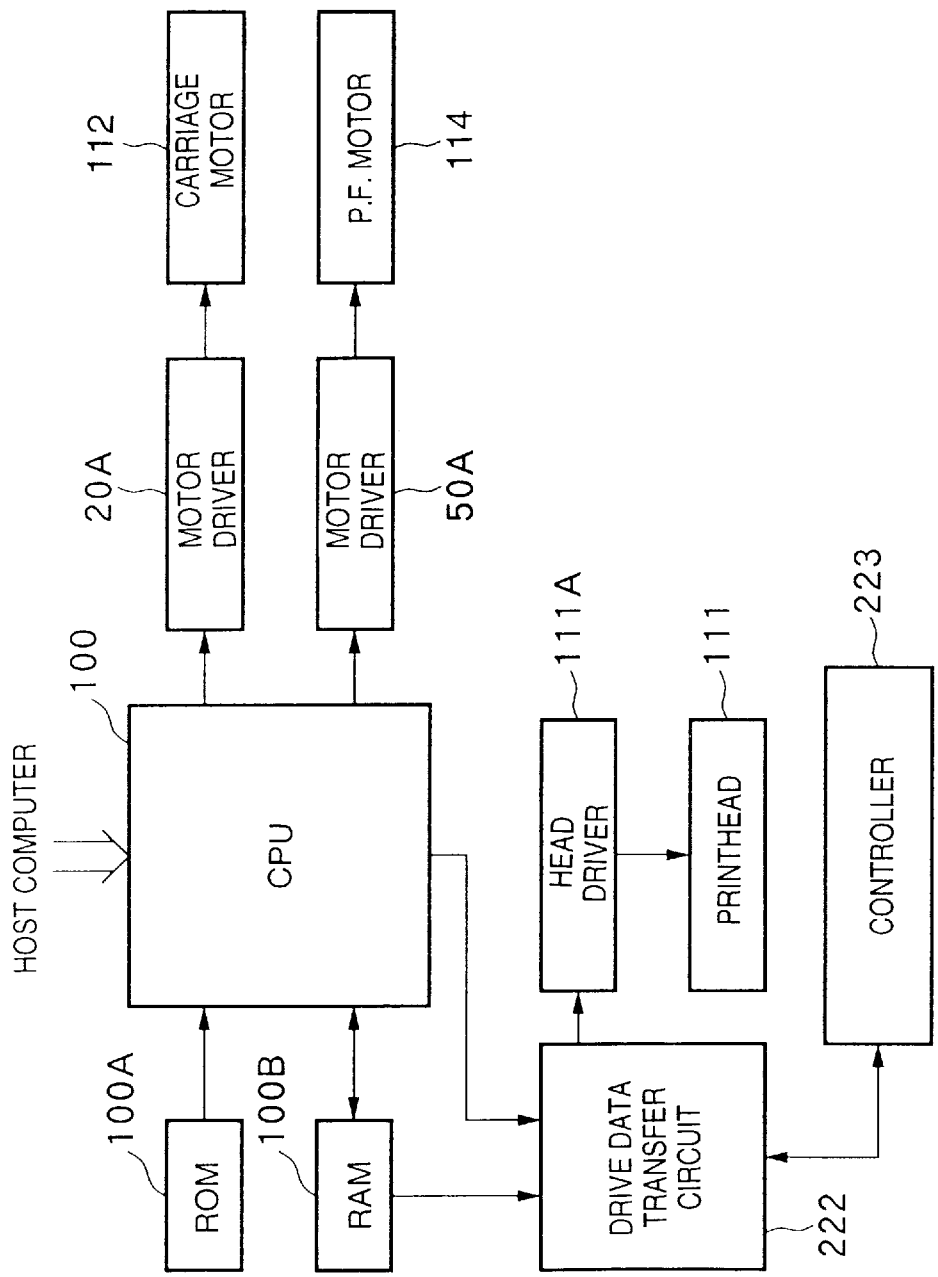
FIG. 2 is a block diagram mainly showing the control function of the color ink-jet printer according to the present embodiment.

FIG. 1 is a perspective view showing an external appearance of the main structure of a printing unit of an ink-jet printer according to the present embodiment, and FIG. 2 is a block diagram showing functional structure of the ink-jet printer.

Referring to FIG. 1, reference numeral 111 denotes a printhead having four ink-jet heads 101 (C), 102 (M), 103 (Y) and 104 (black:K) which are described later. On each front surface of these ink-jet heads 101 to 104 facing a print sheet 2, discharging orifices (nozzles) e.g., 64 orifices uniquely spaced from one another by 600 dpi (dot/inch), are provided along the conveyance direction of the print sheet 2. Each of the ink-jet heads 101 to 104 has an ink path or a liquid channel connected to each of the 64 nozzles. An electrothermal transducer which generates heat energy for discharging ink or processing liquid is formed in each liquid channel on a substrate where each of the ink-jet heads 101 to 104 is constructed. The electrothermal transducer generates heat by an electric pulse applied in accordance with print data, and the generated heat causes film boiling on the ink or the processing liquid, generating bubbles. By the generated bubbles caused by film boiling, ink or processing liquid is discharged from the nozzles. In the ink-jet heads 101 to 104, a common liquid chamber commonly used by each liquid channel connected to each discharge orifice is provided. Ink or processing liquid is supplied to each liquid channel from the common liquid chamber in accordance with discharge operation of each ink-jet head.

The printhead 111 is mounted on a carriage 4, which is slidably engaged with a pair of guide rails 5A and 5B extended in parallel with the print surface of the print sheet 2. Because of this structure, the printhead 111 is capable of reciprocal movement in the PT (print) direction and CR (carriage return) direction along the guide rails 5A and 5B. Printing is performed by discharging ink or processing liquid from the printhead 111 while the carriage 4 is moved. Upon performing one-band printing by moving the printhead 111, the print sheet 2 is conveyed for a distance corresponding to the width of the printed band in the direction indicated by the arrow A, and printing for the next band is started. By repeating the series of the above operation (to be referred to as band print scanning), printing is sequentially performed on the print sheet 2. In the present embodiment, it is assumed that ink is discharged at every 1/1200 inch (i.e. resolution of 1200 dpi) in the direction of carriage movement (scanning direction).

Note that the print sheet 2 is conveyed by rotating a pair of conveyance rollers 3A and 3B, and another pair of rollers 6A and 6B provided on the upper and lower sides of the print surface. On the back of the print surface of the print sheet 2, a platen is provided to keep the print surface flat. The carriage 4 is moved e.g., by conveying a belt 8 provided to the carriage 4 by rotation of a carriage motor 112. The conveyance rollers 3A, 3B, 6A and 6B are similarly rotated by transmitted rotation of a PF (paper feed) motor 114. Reference numeral 15 denotes a group of control circuit boards including a control circuit and the like which receives and processes data transferred from the structure shown in FIG. 2 and a host computer 200.

Referring to FIG. 2, a CPU 100 executes control processing for operating each unit of the ink-jet printer and executes various data processing for printing. In a ROM 100A, processing steps for various data processing and the like are stored. A RAM 100B is used as a work area for executing the processing, and also used as a buffer for storing print data. Reference numeral 20A denotes a motor driver which drives the carriage motor 112 in accordance with a command from the CPU 100, and reference numeral 50A denotes a motor driver which drives the PF motor 114 in accordance with a command from the CPU 100. Reference numeral 222 denotes a drive data transfer circuit which reads multivalued data stored in the RAM 100B while being controlled by a controller 223, converts the multivalued data into binary data and outputs it to a head driver 111A to be printed.

Assuming herein that data having four bits per pixel (16 levels of tone) is transferred from the host computer 200, the CPU 100 temporarily stores the data in the RAM 100B and performs image processing by the use of an algorithm such as a dither method or error diffusion method. The drive data transfer circuit 222 generates one bit per nozzle based on the image data stored in the RAM 100B, and outputs the binary data to the head driver 111A to be printed. By this, ink is discharged from the printhead 111 in accordance with image data. The CPU 100 controls the motor drivers 20A and 50A for respectively driving the carriage motor 112 which drives the carriage 4, and the PF motor 114 which rotates the conveyance rollers 3A, 3B, 6A and 6B.

Figure 3:
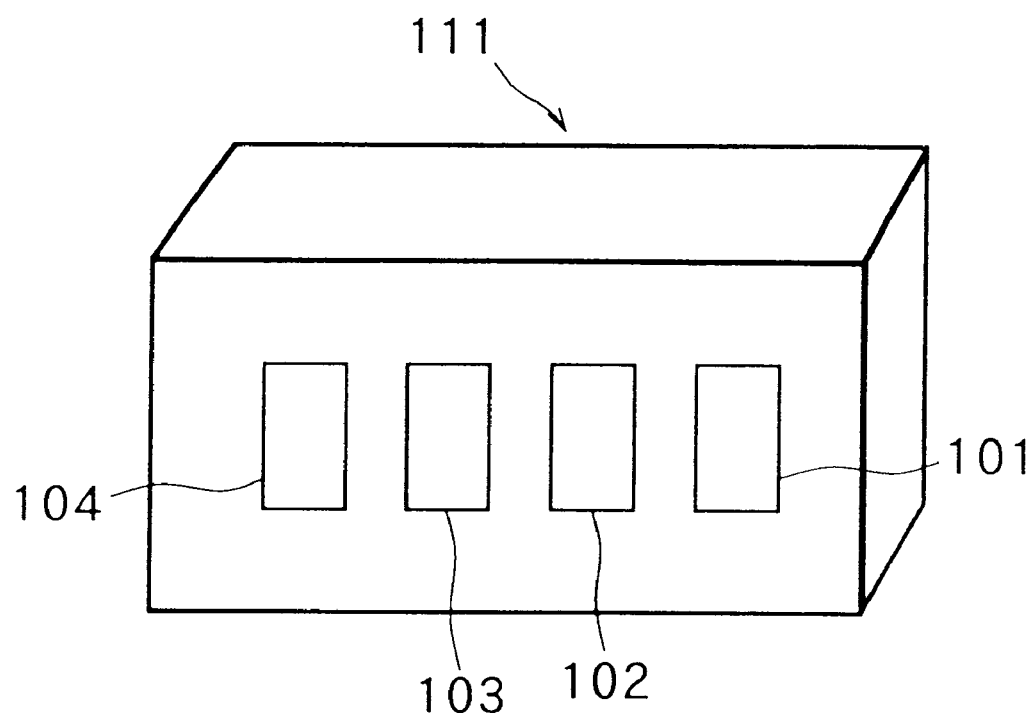
FIG. 3 is a perspective view showing an overall structure of a printhead used in the ink-jet printer of the present embodiment.

FIG. 3 shows a structure of the printhead 111 used by the ink-jet printer of the present embodiment. The reference numeral 101 denotes an ink-jet head for discharging cyan (C) color ink; 102, an ink-jet head for discharging magenta (M) color ink; 103, an ink-jet head for discharging yellow (Y) color ink; and 104, an ink-jet head for discharging black (K) color ink.

Figure 6:
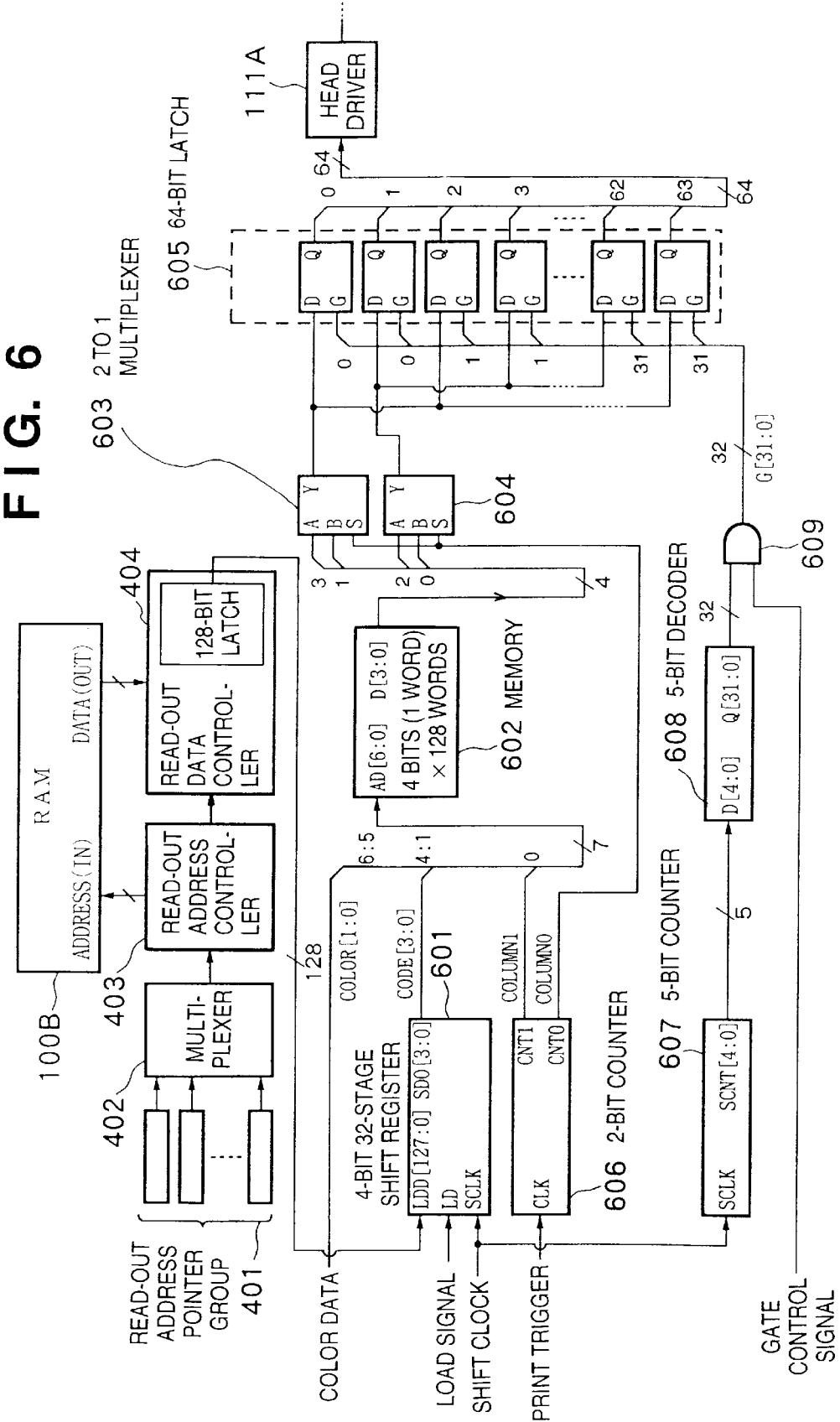
FIG. 6 is a block diagram showing a circuit structure of the drive data transfer circuit according to the first embodiment of the present invention.

FIG. 6 is a block diagram showing an internal structure of the drive data transfer circuit 222.

Figure 4:
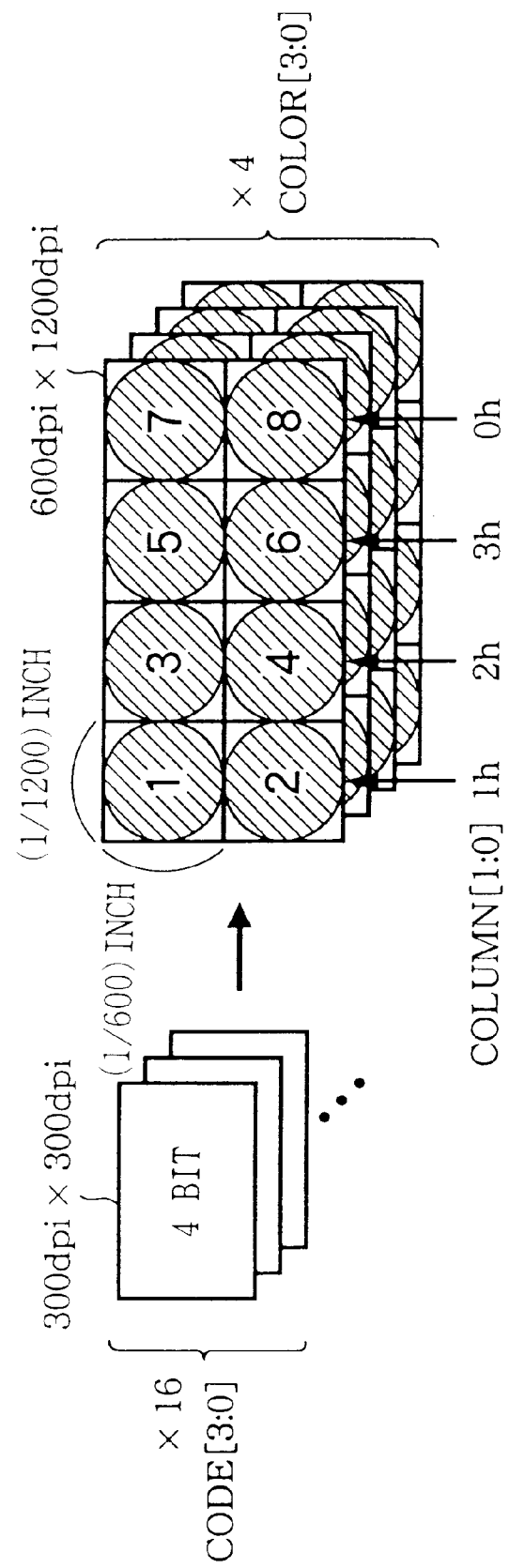
FIG. 4 is an explanatory view for respectively explaining code data CODE[3:0] transferred by a host computer and dot data actually printed.

Assume that, as shown in FIG. 4, the printer according to the present embodiment generates binary data having resolution of 600×1200 dpi based on 4-bit multivalued data (CODE[3:0] indicates that CODE consists of bit 0–bit 3 (total of 4 bits) wherein bit 0 is the lowest bit and bit 3 is the highest bit) having resolution of 300×300 dpi. Moreover, the binary data generated based on CODE[3:0] is different for each color of the C, M, Y and K. Note that in the present embodiment, description is provided for a case where the original image data is multivalued data; however, the original image data may also be binary data.

Ink is discharged by the printhead 111 when the drive data transfer circuit 222 reads print data out of the RAM 100B and supplies the data to the head driver 11A. Hereinafter, the internal operation of the drive data transfer circuit 222 is explained.

A read-out address pointer group 401 is a group of registers storing addresses for reading print data corresponding to each of the C, M, Y and K ink colors out of the RAM 100B. The group of registers consist of four registers each provided to each of the C, M, Y and K data. From the read-out addresses stored in these read-out address pointer group 401, an address which corresponds to a color subjected to processing is selected by a multiplexer 402 and supplied to a read-out address controller 403. The read-out address controller 403 provides the RAM 100B with the supplied address in a predetermined timing, increments the read-out address whereby calculating an address of data to be read out next, and writes it back to a register (not shown) of the read-out address controller 403. Note that the selection of the color to be processed is performed by the controller 223 which controls the entire drive data transfer circuit 222.

A read-out data controller 404 receives data which is outputted from the RAM 100B to a data bus in accordance with the address supplied by the read-out address controller 403. Upon receiving the necessary number of data (in the present embodiment, 4 bits×32 128 bits) from the RAM 100B, the read-out data controller 404 supplies the received data to a shift register 601 having 32 stages each having 4 bits in accordance with a command of the controller 223. The shift register 601, having 32 stages each having 4 bits, provides a memory 602 with 32 multivalued data each having 4 bits and resolution of 300×300 dpi which are supplied by the read-out data controller 404, in 4-bit unit in synchronization with a shift clock SCLK.

The memory 602 serves as a data generation circuit (table) for generating binary data having 600×1200 dpi by performing resolution conversion processing and binary processing on the 4-bit multivalued data having 300×300 dpi which is transferred by the shift register 601 in synchronization with the shift clock SCLK. According to the present embodiment, the memory 602 has a capacity for 128 words where one word is represented by 4 bits. The input address thereof has 7 bits (128 words) and the output data has 4 bits.

Figure 5:
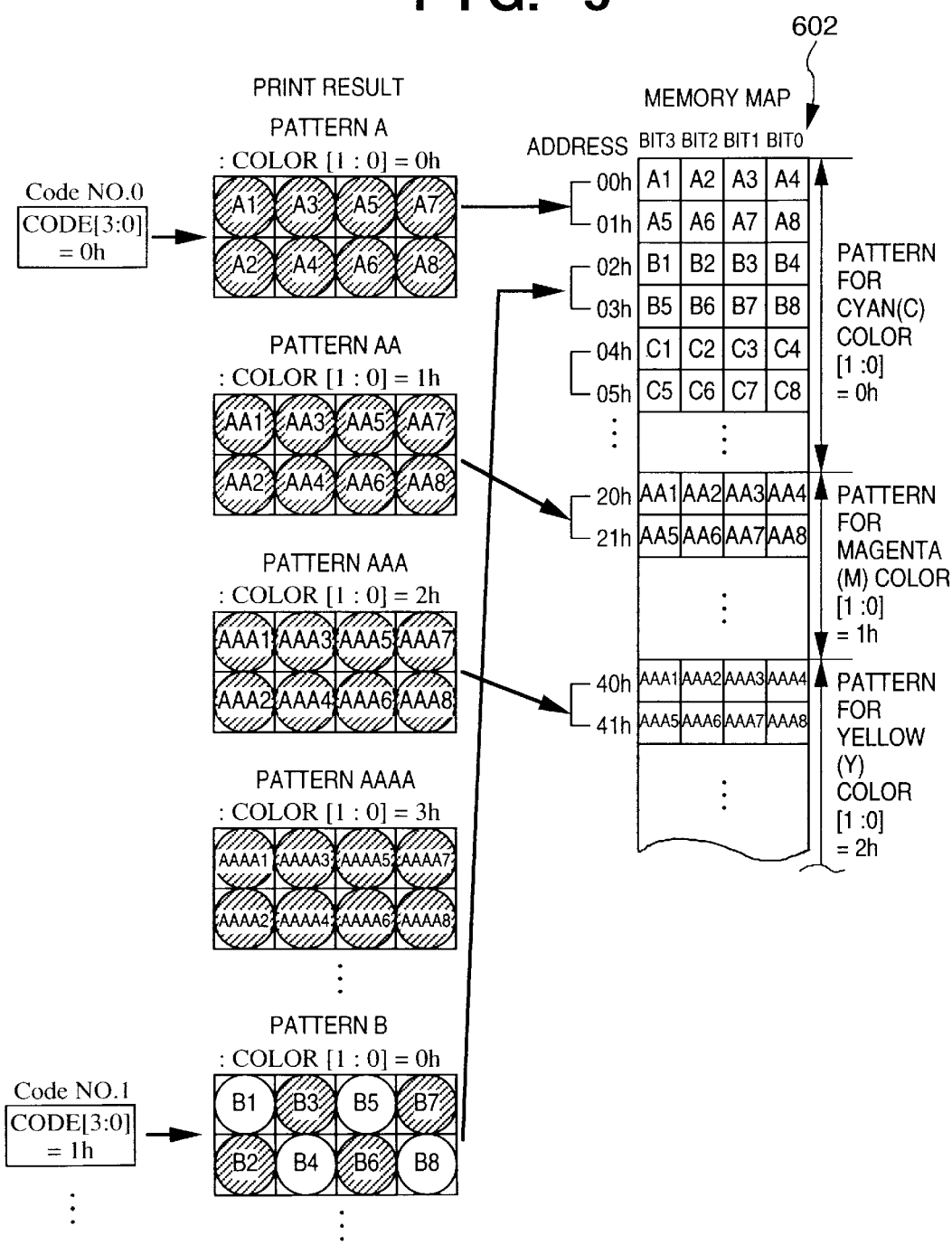
FIG. 5 is an explanatory view for describing a memory map of a memory 602 of a drive data transfer circuit according to the present embodiment.

FIG. 5 shows patterns of binary data having 600×1200 dpi, which correspond to a value (multivalued level) of CODE[3:0], and the arrangement of the patterns in the memory 602. For instance, four types of patterns: pattern A, AA, AAA and AAAA each corresponding to respective colors, are prepared for the multivalued data CODE[3:0]= "0h" (h denotes hexadecimal number). As described above, the four patterns respectively correspond to the C, M, Y and K ink colors. In other words, the pattern A corresponds to cyan (COLOR[1:0]=0h), the pattern AA corresponds to magenta (COLOR[1:0]=1h), the pattern AAA corresponds to yellow (COLOR[1:0]=2h), and the pattern AAAA corresponds to black (K) (COLOR[1:0]=3h). In addition, for multivalued data CODE[3:0]="1h", four patterns: pattern B, BB (not shown), BBB (not shown) and BBBB (not shown) are prepared for each of the C, M, Y and K colors. With respect to multivalued data CODE[3:0]=2h, CODE[3:0]= 0Fh, patterns corresponding to each of the C, M, Y and K colors are similarly prepared.

Next, the arrangement of the patterns in the memory 602 is described. Each pattern is divided in 1/600 inch (=2×1/1200) unit having 4 bits each in the scanning direction of the carriage 4, and arranged in the consecutive addresses of the memory 602. For instance, in the example shown in FIG. 5, "A1, A2, A3, A4" are arranged in the address "00h" (cyan, CODE=0, COLUMN1=0) and "A5, A6, A7 and A8" are arranged in the address "01h" (cyan, CODE=0, COLUMN1=1). Further, "B1, B2, B3 and B4" and "B5, B6, B7 and B8" are respectively arranged in the address "02h" and "03h" so that the pattern corresponding to the same color is arranged in the consecutive addresses. A pattern divided in 4-bit unit is outputted as a 4-bit output of the memory 602. Details thereof will be described later.

Referring to each pattern shown in FIG. 5, the hatched pixels denote pixels (resolution 600×1200 dpi) subjected to ink discharge, and the white pixels denote pixels not subjected to ink discharge. For instance, in the pattern A, ink is discharged for all the pixels A1, A2, . . . A8, and in the pattern B, ink is discharged for pixels B2, B3, B6 and B7.

Referring back to FIG. 6, the 4-bit output read out of the memory 602 is supplied to a 64-bit latch 605 via 2 inputs-1 output multiplexers 603 and 604. As can be seen from the drawing in FIG. 5, since the 4-bit output of the memory 602 includes two pairs of data (a combination of A1 and A2, and a combination of A3 and A4) where each data is arranged in a position different from each other by 1/1200 inch in the scanning direction of the carriage 4, data corresponding to the necessary position is selected by the multiplexers 603 and 604.

The 64-bit latch 605 sequentially stores, every two bits, generated data (binary data) having resolution of 600×1200 dpi in synchronization with the shift clock SCLK. After the 64-bit latch 605 stores the generated data in every two bits for 32 times (corresponding to 64 bits, i.e. for 64 nozzles), the 64-bit latch 605 supplies the stored data to the head driver 111A in accordance with a command of the controller 223.

A 2-bit counter 606 in FIG. 6, which detects the position of the carriage 4 in the scanning direction, counts the print trigger generated for each 1/1200 inch in the main scanning direction and generates 2-bit position data COLUMN[1:0] (See FIG. 4). The upper bit COLUMN1 of the two-bit position data COLUMN[1:0] is supplied to the memory 602 as an address, along with the multivalued data CODE[3:0] outputted by the shift register 601 and color data COLOR [1:0] supplied by the controller 223. Furthermore, the lower bit COLUMN0 of the position data COLUMN[1:0] is supplied to the multiplexers 603 and 604 respectively as position data in units of 1/1200 (inch). More specifically, the upper bit 1 (COLUMN1) of the COLUMN[1:0] is set to the bit 0 of the 7-bit address to the memory 602; 4-bit code CODE [3:0] is set to the bit 1 to 4 of the address; and color data COLOR[1:0] is set to the bit 5 and 6 of the address. The multiplexers 603 and 604 first select bit 3 and bit 2 (e.g., A1 and A2 in the case of address 00h in FIG. 5) from the 4-bit data read out of the memory 602, then select bit 1 and bit 0 (A3 and A4 in the case of address 00h in FIG. 5) in the next print timing (See FIG. 5) and transfer each data to the 64-bit latch 605.

A 5-bit counter 607 and 5-bit decoder 608 are circuits for controlling the latching of data in the 64-bit latch 605. More specifically, the counter 607 counts the shift clock SCLK supplied by the shift register 601. By decoding the counted value by the decoder 608, it is decided where the binary data generated by the multiplexers 603 and 604 is to be stored in the 64-bit latch 605. Note that AND gates 609 have 32 AND circuits. Each 1-bit signal (total 32 signals) from the decoder 608 and a gate control signal are inputted to each of the AND circuits, a logical AND between the gate control signal and an output of the decoder 608 is obtained, and when the gate control signal becomes enable (high), one of 32-bit gate signals for designating the latch 605 in correspondence with a count value of the counter 607 becomes high level to latch the outputs of the multiplexers 603 and 604 into the latch 605. The gate control signal serves to prevent the storing of unnecessary data in the latch 605. By virtue of this, the first 2-bit data selected by the multiplexers 603 and 604 and read out of the memory 602 is stored in the top two latches, and the next 2-bit data is stored in the subsequent two latches. In the similar manner, data is sequentially stored in unit of two bits in the subsequent latches, and the 32nd 2-bit data is stored in the bottom two latches.

It is assumed that a load signal LD and shift clock SCLK inputted to the shift register 601, a print trigger inputted to the 2-bit counter 606 as a clock signal, color data COLOR [3:0] and the like are outputted by the controller 223 in a predetermined timing.

Figure 7:
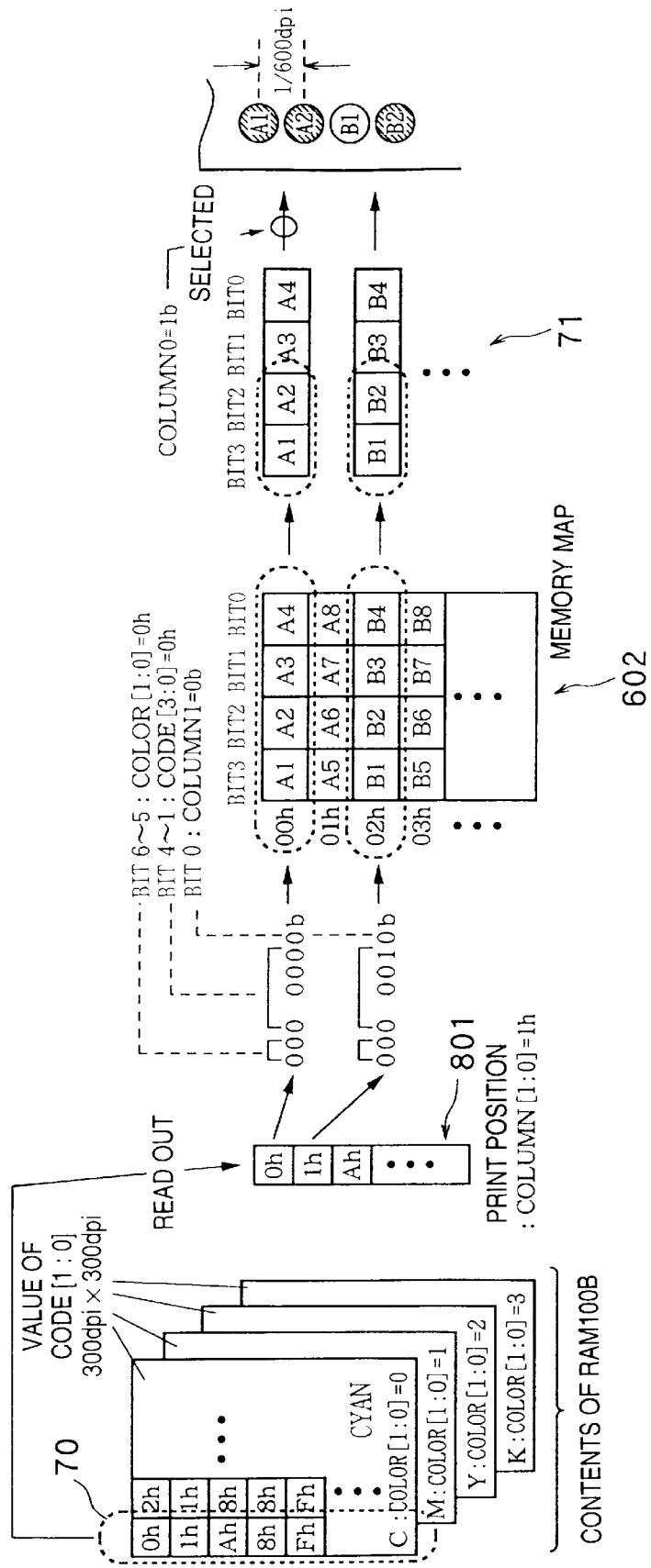
FIG. 7 is an explanatory view for explaining conversion of code data to binary data in the drive data transfer circuit according to the first embodiment of the present invention.

Next, operation of the drive data transfer circuit 222 will be described with reference to the conceptualized view in FIG. 7.

Assume herein that the read-out data controller 404 reads a 4-bit multivalued data column 801, having resolution of 300×300 dpi, out of a data area 70 which corresponds to cyan (COLOR[1:0]=0h) in the RAM 100B, and supplies the read data to the shift register 601. The shift register 601 transfers the supplied multivalued data column 801 as an address of the memory 602 in the sequential manner e.g., "0h", "1h", "Ah", "8h", . . . , in synchronization with the shift clock (SCLK) from the controller 223. Herein, assuming that the position where the data column 801 is to be recorded corresponds to the COLUMN[1:0]=1h (see FIG. 4) in the scanning direction of the carriage 4, a value supplied to the address of the memory 602 would be "0000000b" (b denotes a binary value) (COLOR[1:0]=0h (cyan), CODE [3:0]=0h (multivalued data 0h), COLUMN1=0) for the first multivalued image data "0h". For the next multivalued image data "1h", the value would be "0000010b" (COLOR [1:0]=0h (cyan), CODE[3:0]=1h (multivalued data 1h), COLUMN1=0); for the next multivalued image data "Ah", the value would be "0010100b"; and for the next multivalued image data "8h", the value would be "0010000b". Therefore, the values of the 4-bit output read out of the memory 602 change as indicated by reference numeral 71 in FIG. 7, "A1, A2, A3 and A4", "B1, B2, B3 and B4" . . . Herein, since COLUMN0=1, the multiplexers 603 and 604 select bit 3 (A1, B1, . . . ) and bit 2 (A2, B2, . . . ) out of the 4-bit output of the memory 602 and sequentially latch the data in the latch 605.

More specifically, each of the multiplexers 603 and 604 inputs COLUMN0 as a select signal (S), and when the COLUMN0 is "0" indicative of a low level, an input B is selected and outputted; and when the COLUMN0 is "1" indicative of a high level, an input A is selected and outputted. Therefore, when printing is performed in the forward-scan direction, the input value of the 64-bit latch 605 is "A1, A2", "B1, B2", . . . in the sequence of the nozzle (bit 0) on the printhead 111. In accordance with a command of a latch signal G[31:0] controlled by counting the shift clock SCLK, these binary data are sequentially stored in unit of 2 bits, starting from "0" in the 64-bit latch 605 (in FIG. 6, from the top). After 64 bits of data (corresponding to 64 nozzles) have been stored in the latch 605, a command is transmitted by the controller 223 to supply the data from the 64-bit latch 605 to the head driver 11A, and ink corresponding to the data is discharged by the printhead 111.

By performing the above-described image processing and determining data to be printed in every $1/1200$ (inch) in the scanning direction of the carriage 4, an image is formed on the print sheet 2.

Figure 8:
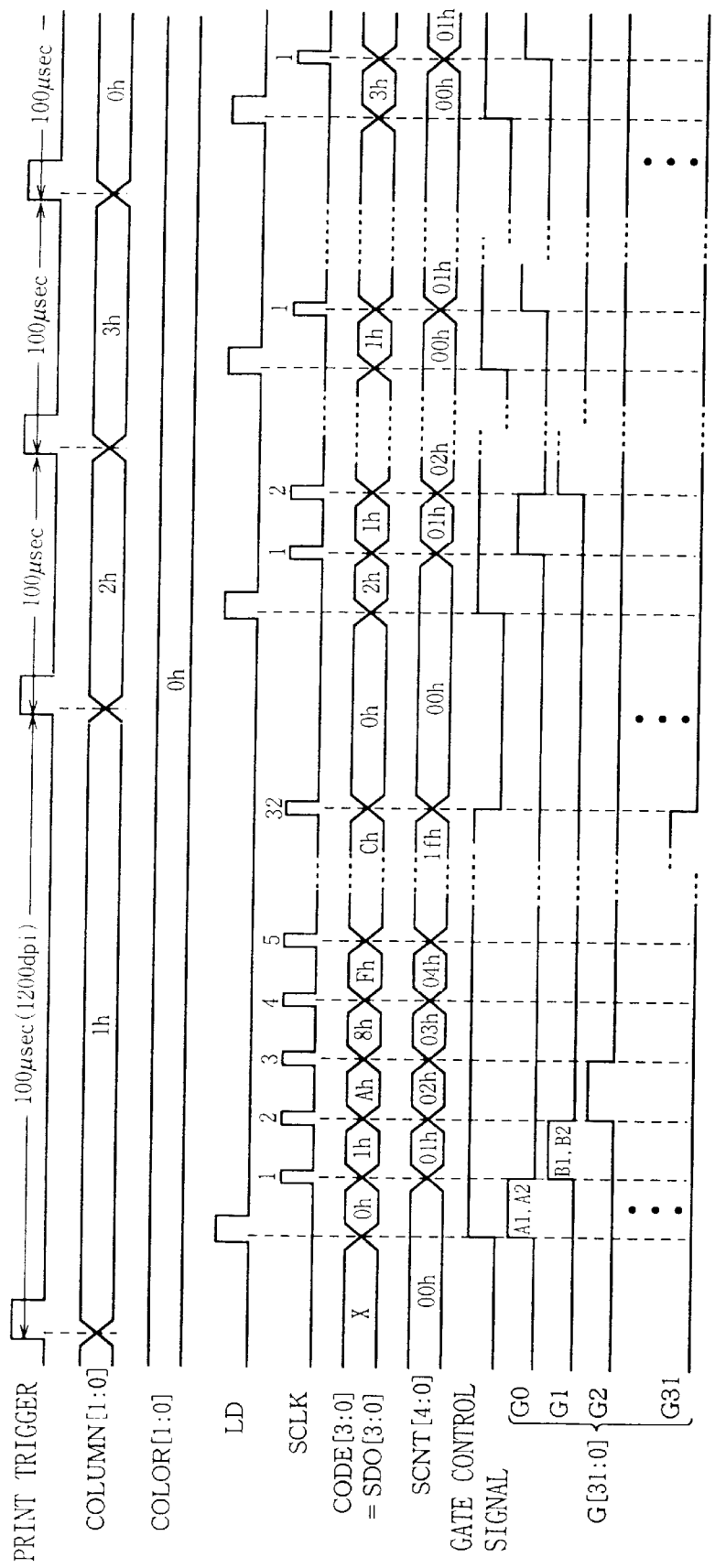
FIG. 8 is a timing chart showing a print operation of the drive data transfer circuit according to the first embodiment of the present invention for printing in one color.
Figure 9:
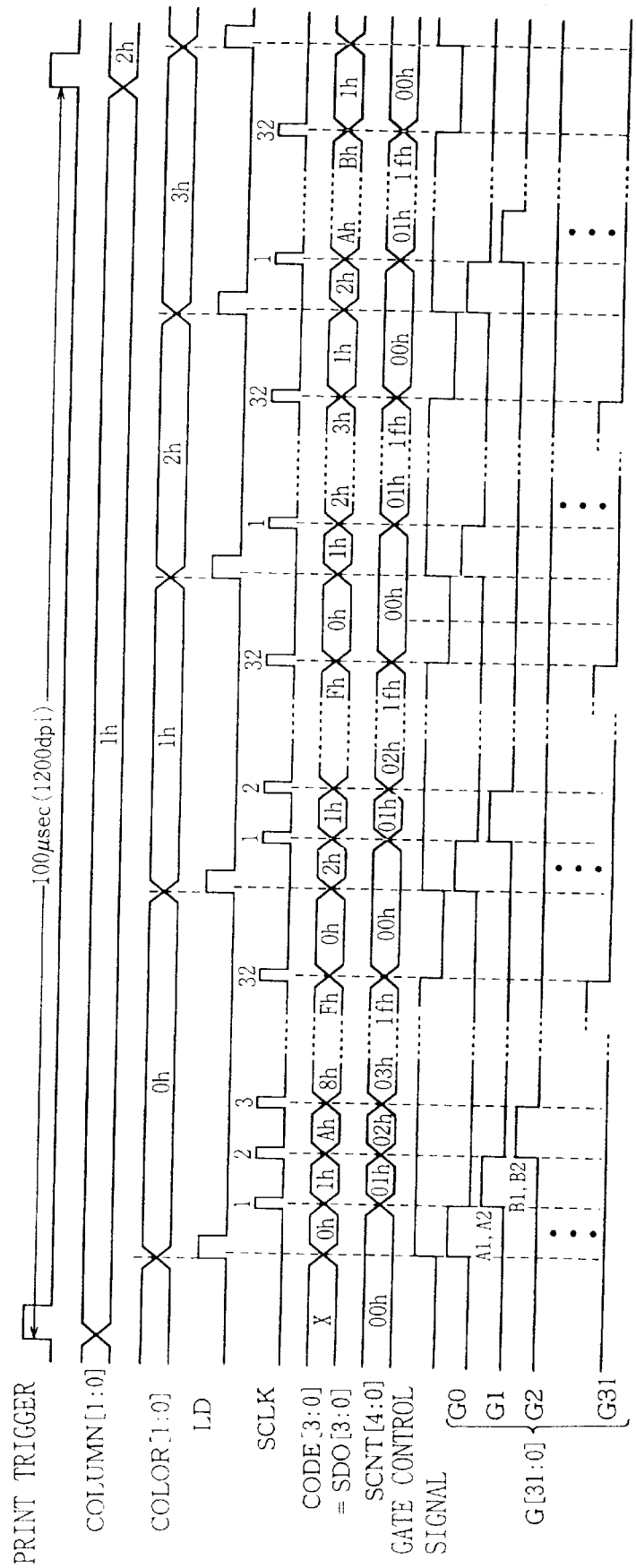
FIG. 9 is a timing chart showing print operation of the drive data transfer circuit according to the first embodiment of the present invention for printing in multiple colors.

FIGS. 8 and 9 are timing charts showing changes of internal signals in the drive data transfer circuit 222 according to the first embodiment. FIG. 8 shows a case of printing in one color and FIG. 9 shows a case of printing in all colors of C, M, Y and K.

Referring to FIG. 8, assuming that a discharge frequency of the printhead 111 is e.g., 10 KHz, the print trigger is generated in every 100$\mu$ seconds; and the aforementioned image processing, including reading data out of the RAM 100B, is repeated each time. It can be seen from FIG. 8 that the value of COLUMN[1:0], outputted from the 2-bit counter 606, changes as "0h", "1h", "2h", "3h" and "0h" . . . , as the print trigger is generated.

Further, the load signal LD in FIG. 8 is supplied by the controller 223 when the necessary number of data (128 bits) is read out of the RAM 100B. When the load signal LD becomes high level, 32 multivalued data (CODE[3:0]) each having 4 bits and having resolution of 300×300 dpi, are loaded to the shift register 601. Upon loading the data to the shift register 601, 32 shift clocks SCLK are supplied by the controller 223 to the shift register 601, and multivalued data CODE[3:0] is transferred as an address of the memory 602 e.g., "0h", "1h", "Ah", . . . .

Moreover, the signal SCNT[4:0] in FIG. 8 is an output from the 5-bit counter 607 which counts the shift clock SCLK. The signal G[31:0] is a logical AND (an output from the AND gates 609) between a decoded result of the SCNT signal SCNT[4:0] decoded by the 5-bit decoder 608 and the gate control signal supplied by the controller 223. According to the signal G[31:0], 2-bit data selected by the multiplexers 603 and 604 is stored in two latches of the 64-bit latch 605. The gate control signal rises when the signal LD is generated, and falls when the 32nd shift clock SCLK is generated. By this, storing unnecessary data in the 64-bit latch 605 is prevented.

In FIG. 9, data processing corresponding to four colors is sequentially performed in the order of C, M, Y and K in response to one print trigger. This is because a data generation circuit is not provided for each color in the present embodiment. In FIG. 9, the load signal LD supplied by the controller 223 is also generated four times. It can be seen from FIG. 9 that along with the load signal LD, color data COLOR[1:0] supplied by the controller 223 sequentially changes, i.e. "0h (cyan)", "1h (magenta)", "2h (yellow)" and "3h (black)". Note that the processing for each of the C, M, Y and K color ink in FIG. 9 is basically same as the operation described in the timing chart in FIG. 8.

Figure 10:
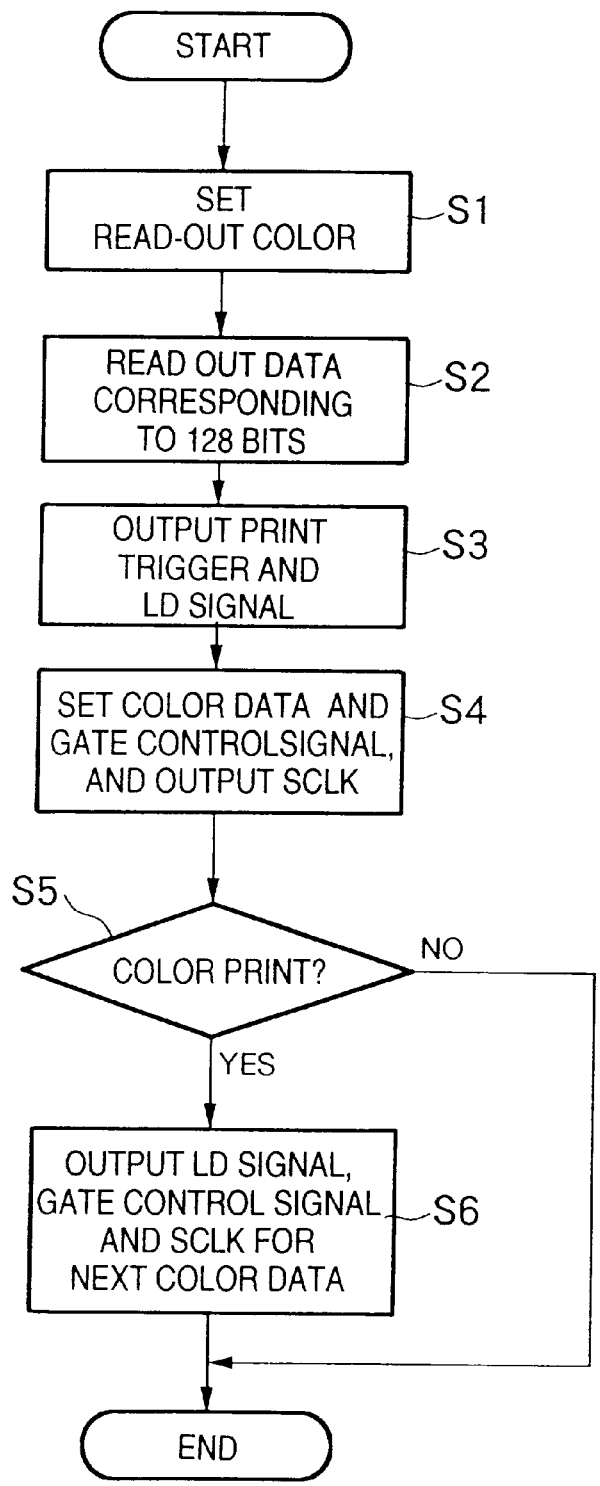
FIG. 10 is a flowchart showing control processing of a drive data transfer circuit control unit according to the present embodiment.

FIG. 10 is a flowchart showing data generation processing by the controller 223 according to the present embodiment for single ink discharge by the printhead 111.

First in step S1, a color to be read (color to be used in printing) is set. In step S2, a read-out address in the RAM 100B is set to the pointer of the color, which has been set in step S1, in the read-out address pointer group 401, and image data is read out while being controlled by the read-out address controller 403. Then, the read-out address controller 404 determines whether or not e.g., 32 data (total of 128 bits), is read out. When the read-out data controller 404 reads out data corresponding to 128 bits, the processing proceeds to step S3 where the print trigger and load signal LD are outputted and the 128-bit data is loaded from the read-out data controller 404 to the shift register 601. Next, the processing proceeds to step S4 where the gate control signal and color data COLOR[1:0] are set and 32 pulses of the shift clock SCLK are outputted. By this, data converted in the memory 602 is latched in the 64-bit latch 605 and outputted to the head driver 111A.

In step S5, it is determined whether or not the print processing is to be performed based on color data, and if color printing is to be performed, the processing proceeds to step S6 to output the next color data. As shown in the timing chart in FIG. 9, the data for the next color is read out of the RAM 100B, then the load signal LD and shift clock SCLK are outputted, and the gate control signal and color data are set. In this manner, image data for that color is outputted to the corresponding printhead as similar to the foregoing description. By performing this processing for all the colors used in printing, a desired full-color image is printed.

As apparent from the foregoing description, according to the first embodiment, it is possible to realize resolution conversion and conversion from multivalued data to binary data in real time. Accordingly, data transfer speed is improved and throughput of print data processing is increased.

Moreover, since it is not necessary to store print data where resolution conversion and binary conversion are performed, the memory capacity of the RAM 100B storing received image data can be made smaller than the conventional one. By virtue of this, the effect of cost reduction can be attained.

Furthermore, since it is possible to generate print data having higher resolution than resolution of inputted image data, the high precision characteristic of a printhead can be fully utilized.

As apparent from the above description, the present embodiment realizes resolution conversion and binary processing in real time. Therefore, improvement in data transfer speed and increase in throughput is attained.

Moreover, since it is not necessary to store data where resolution is again converted or binary data, the memory capacity of the RAM 100B can be kept smaller than that of the conventional apparatus. Accordingly, cost reduction is attained.

Furthermore, since print data having a desired resolution can readily be obtained, the high precision characteristic of a printhead is fully utilized.

Second Embodiment

Figure 11:
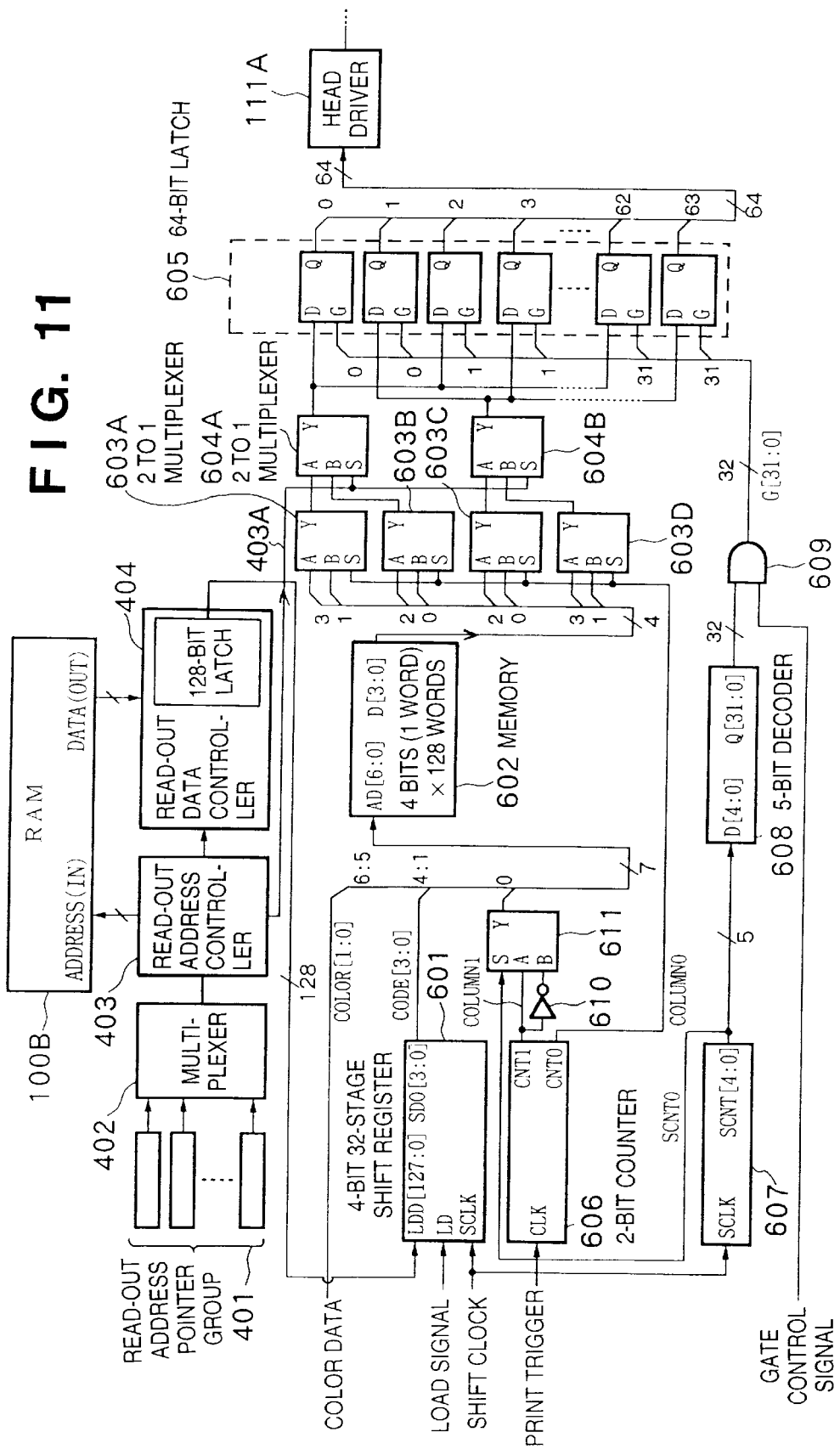
FIG. 11 is a block diagram showing a circuit structure of a drive data transfer circuit according to the second embodiment of the present invention.

FIG. 11 is a block diagram showing a circuit structure of the drive data transfer circuit 222a according to the second embodiment of the present invention. Components common to those in the structure shown in FIG. 6 will be referred by the same reference numerals and description thereof will be omitted.

The drive data transfer circuit 222a shown in FIG. 11 is obtained by modifying the drive data transfer circuit 222 described in the first embodiment. It is noted that, when FIG. 11 is compared with FIG. 6, multiplexers 603A to 603D, 604A and 604B are provided in FIG. 11 in place of the multiplexers 603 and 604 in FIG. 6, and also in FIG. 11, a multiplexer 611 and an inverter 610 are further added to the structure in FIG. 6.

Figure 13C:
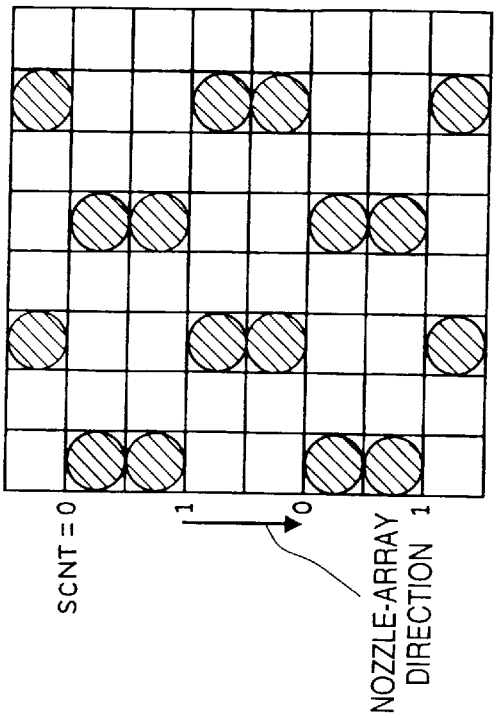
FIGS. 13A to 13C show comparison examples comparing the process performed by the drive data transfer circuit according to the second embodiment with the process performed by the drive data transfer circuit according to the first embodiment.
Figure 13B:
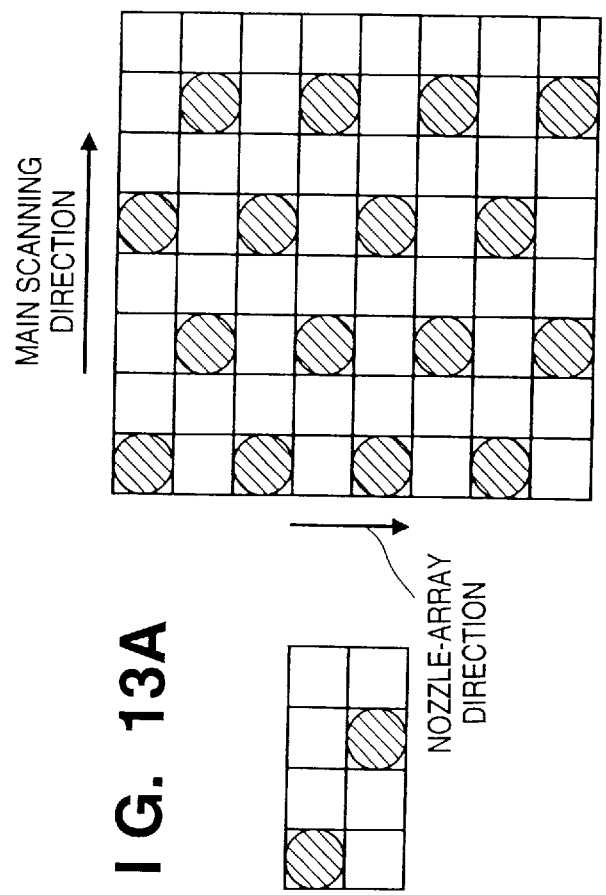
Figure 13A:
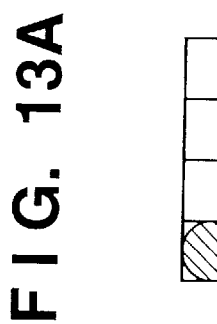

FIGS. 12A to 12C and 13A to 13C are explanatory views for describing output results of these two drive data transfer circuits 222 and 222a. In these figures, FIGS. 12A and 13A show the original pattern (the pattern corresponding to the CODE stored in the memory 602); FIGS. 12B and 13B show output results from the drive data transfer circuit 222 in FIG. 6; and FIGS. 12C and 13C show output results from the drive data transfer circuit 222a in FIG. 11.

As mentioned above, in the drive data transfer circuit 222a in FIG. 11, the multiplexer 611 and inverter 610 are added to the drive data transfer circuit 222 in FIG. 6. Among the output signal SCNT[4:0] outputted from the 5-bit counter 607, SCNT0 corresponding to bit 0 is connected with a select signal (S) of the multiplexer 611. Note that as similar to the multiplexers 603 and 604, the multiplexer 611 selects and outputs input B when the select signal (S, i.e. SCNT0) is in the low level, and selects and outputs input A when the select signal (S, i.e. SCNT0) is in the high level. To the input A, the output CNT1 of the 2-bit counter 606 is connected, and to the input B, CNT1 inverted by the inverter 610 is connected. Therefore, when the 5-bit counter 607 counts a shift clock (SCLK) and as the level of the SCNT0 changes as low, high, low, high, . . . , input B, input A, input B, input A, . . . , is sequentially selected as an output of the multiplexer.

In the second embodiment, each time the shift clock is generated, two print data, whose positions are apart from each other by 1/600 (inch) in the nozzle-array direction, are generated. Therefore, in the drive data transfer circuit 222a, each time two data, positioned apart from each other by 1/600 (inch), are generated (i.e., every 300 dpi), the output (COLUMN1) of the multiplexer 611 changes as inverted CNT1, CNT1, inverted CNT1, CNT1. . . Thus, the drive data transfer circuit 222a in FIG. 11 supplies an address of the memory 602 with "0000001b" for the multivalued data "0h" in the conceptualized view in FIG. 7, unlike the drive data transfer circuit 222 in FIG. 6. For the multivalued data "1h" whose positions are apart by 300 dpi in the nozzle-array direction, CNT1 is selected, thus "0000010b" is supplied to the address. Therefore, the 4-bit output of the memory 602 changes as "A5, A6, A7 and A8", "B1, B2, B3 and B4" . . . . different from that shown in FIG. 7. Since COLUMN0=1 herein, the multiplexers 603A to 603D, 604A and 604B select only bit 3 (A5, B1, . . . ) and bit 2 (A6, B2, . . . ) from the output of the memory 602. In the first embodiment, "A1, A2, A3 and A4" are outputted for the multi-valued data "0h" and "B1, B2, B3 and B4" are outputted for the multi-valued data "1h", whereas in the second embodiment, "A5, A6, A7 and A8 " and "B5, B6, B7 and B8" are respectively outputted. As a result, a pattern where the first column and the third column are switched and a pattern where the second column and the fourth column are switched are printed every 300 dpi i.e., every multi-valued data, in the nozzle-array direction.

On the other hand, each of the multiplexers 603A to 603D inputs COLUMN0 as a select signal (S), and selects and outputs the input B when the COLUMN0 is "0" indicative of a low level, and selects and outputs the input A when the COLUMN0 is "1" indicative of a high level.

Similarly, each of the multiplexers 604A and 604B selects and outputs the input B when the input (S) is in the low level and selects and outputs the input A when the input (S) is in the high level. Note that the input (S) (signal 403A outputted by the read-out address controller 403) of the multiplexers 604A and 604B is set in the high level (selects input A) when printing is performed in odd-number scanning by the carriage 4, and is set in the low level (selects input B) when printing is performed in even-number scanning by the carriage 4. More specifically, in the odd-number scanning, the multiplexer 604A selects outputs of the multiplexer 603A and the multiplexer 604B selects outputs of the multiplexer 603C. This state is same as that of the first embodiment shown in FIG. 6. Meanwhile, in the even-number scanning, the multiplexer 604A selects outputs of the multiplexer 603B and the multiplexer 604B selects outputs of the multiplexer 603D. This state is an inverted state of that of the first embodiment, i.e. bit 2, bit 3, bit 0 and bit 1. Thus, a pattern inverted in the nozzle-array direction is printed. Note that in the case of bi-directional printing, printing in the even-number scanning is performed at the time of forward scanning.

In this manner, the input value of the 64-bit latch is respectively "A5, A6", "B1, B2" . . . , starting from the upper nozzle (bit 0) of the printhead 111 at the time of printing in the odd-number scanning. When binary data corresponding to 64 bits (corresponding to 64 nozzles) are stored in the 64-bit latch 605 in accordance with the command of the latch signal G[31:0] which is controlled by counting the shift clock SCLK, the command is outputted by a drive data transfer circuit 222a to supply the data from the 64-bit latch 605 to the head driver 111A and ink corresponding to the data is discharged.

Figure 14A:
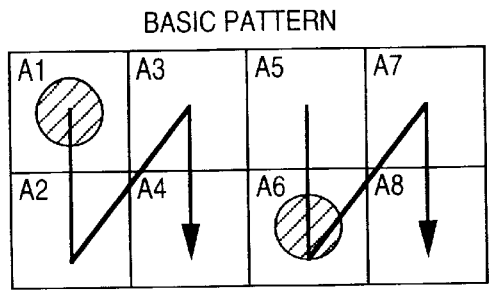
FIGS. 14A to 14C show comparison examples comparing the process performed by the drive data transfer circuit according to the second embodiment with the process performed by the drive data transfer circuit according to the first embodiment.
Figure 14B:
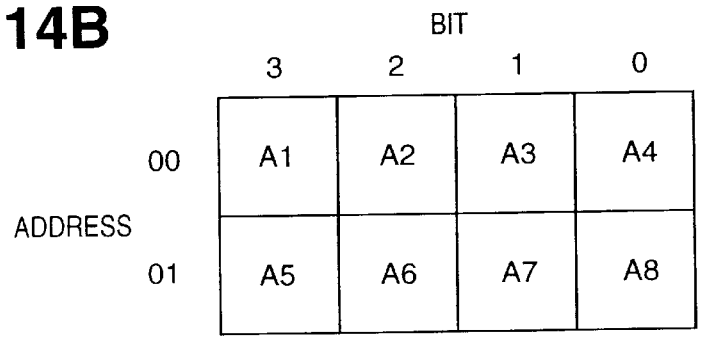

The above operation is now described in detail, using an example in which a basic pattern shown in FIG. 14A is printed. Note that the basic pattern in FIG. 14A is stored in the memory in FIG. 14B. Herein, it is assumed that the input (S) of the multiplexers 604A and 604B is "1" (select input A).

(1) First Column

When an initial print trigger is inputted, the counter 606 is incremented, resulting in CNT0=1 (COLUMN0=1) and CNT1=0 (COLUMN1=0).

(a) For the 0th nozzle (the top nozzle) and the 1st nozzle (second from the top nozzle)

Since the counter 607 has not yet been incremented at this stage, SCNT0=0, and the multiplexer 611 selects the input B (CNT1/: inverted CNT1 (=1)). By this, the least significant bit in the address of the memory 602 becomes (1), selecting "A5, A6, A7 and A8" in FIG. 14B. At this stage, since the input (S) of the multiplexers 603A to 603D is "1", input A is selected, and the multiplexers 604A and 604B respectively select "A5" for bit 3 and "A6" for bit 2 which are then outputted to the 64-bit latch 605. At this stage, since an output of the decoder 608 is "0", "A5" is set to the latch corresponding to the 0th nozzle (the top nozzle) of the 64-bit latch, and "A6" is set to the latch corresponding to the subsequent 1st nozzle.

(b) For the 2nd nozzle (third from the top nozzle) and the 3rd nozzle (fourth from the top nozzle)

Since a shift clock (SCLK) is outputted, the counter 607 is incremented by 1 and the input (S) of the multiplexer 611 becomes "1", and the input A (CNT1=0) is selected this time. Accordingly, the least significant bit in the address of the memory 602 becomes (0), selecting "A1, A2, A3 and A4" in FIG. 14B. At this stage, since the input (S) of the multiplexers 603A to 603D is "1", input A is selected, and the multiplexers 604A and 604B respectively select "A1 " for bit 3 and "A2" for bit 2 which are then outputted to the 64-bit latch 605. At this stage, since an output of the decoder 608 is "1", "A1 " is set to the latch corresponding to the 3rd nozzle from the top of the 64-bit latch, and "A2" is set to the latch corresponding to the 4th nozzle.

(2) Second Column

The counter 606 is incremented upon a print trigger input, resulting in CNT0=0 (COLUMN0=0) and CNT1=1 (COLUMN1=1).

(a) For the 0th nozzle (the top nozzle) and the 1st nozzle (second from the top nozzle)

Since the counter 607 has not yet been incremented at this stage, SCNT0=0, and the multiplexer 611 selects the input B (CNT1/: inverted CNT1 (=0)). By this, the least significant bit in the address of the memory 602 becomes (0), selecting "A1, A2, A3 and A4" in FIG. 14B. At this stage, since the input (S) of the multiplexers 603A to 603D is "0", input B is selected, and the multiplexers 604A and 604B respectively select "A3" for bit 1 and "A4" for bit 0 which are then outputted to the 64-bit latch 605. At this stage, since an output of the decoder 608 is "0", "A3" is set to the latch corresponding to the 0th nozzle (the top nozzle) of the 64-bit latch, and "A4" is set to the latch corresponding to the subsequent 1st nozzle.

(b) For the 2nd nozzle (third from the top nozzle) and the 3rd nozzle (fourth from the top nozzle)

Since a shift clock (SCLK) is outputted, the counter 607 is incremented by 1 and the input (S) of the multiplexer 611 becomes "1", and the input A (CNT1=0) is selected this time. Accordingly, the least significant bit in the address of the memory 602 becomes (1), selecting "A5, A6, A7 and A8" in FIG. 14B. At this stage, since the input (S) of the multiplexers 603A to 603D is "0", input B is selected, and the multiplexers 604A and 604B respectively select "A7" for bit 1 and "A8" for bit 0 which are then outputted to the 64-bit latch 605. At this stage, since an output of the decoder 608 is "1", "A7" is set to the latch corresponding to the 3rd nozzle from the top of the 64-bit latch, and "A8" is set to the latch corresponding to the 4th nozzle.

(3) Third Column

The counter 606 is incremented upon a print trigger input, resulting in CNT0=1 (COLUMN0=1) and CNT1=1 (COLUMN1=1).

(a) For the 0th nozzle (the top nozzle) and the 1st nozzle (second from the top nozzle)

Since the counter 607 has not yet been incremented at this stage, SCNT0=0, and the multiplexer 611 selects the input B (CNT1/: inverted CNT1 (=0)). By this, the least significant bit in the address of the memory 602 becomes (0), selecting "A1, A2, A3 and A4" in FIG. 14B. At this stage, since the input (S) of the multiplexers 603A to 603D is "1", input A is selected, and the multiplexers 604A and 604B respectively select "A1 " for bit 3 and "A2" for bit 2 which are then outputted to the 64-bit latch 605. At this stage, since an output of the decoder 608 is "0", "A1 " is set to the latch corresponding to the 0th nozzle (the top nozzle) of the 64-bit latch, and "A2" is set to the latch corresponding to the subsequent 1st nozzle.

(b) For the 2nd nozzle (third from the top nozzle) and the 3rd nozzle (fourth from the top nozzle)

Since a shift clock (SCLK) is outputted, the counter 607 is incremented by 1 and the input (S) of the multiplexer 611 becomes "1", and the input A (CNT1=0) is selected this time. Accordingly, the least significant bit in the address of the memory 602 becomes (1), selecting "A5, A6, A7 and A8" in FIG. 14B. At this stage, since the input (S) of the multiplexers 603A to 603D is "1", input A is selected, and the multiplexers 604A and 604B respectively select "A5" for bit 3 and "A6" for bit 2 which are then outputted to the 64-bit latch 605. At this stage, since an output of the decoder 608 is "1", "A5" is set to the latch corresponding to the 3rd nozzle from the top of the 64-bit latch, and "A6" is set to the latch corresponding to the 4th nozzle.

(4) Fourth Column

The counter 606 is incremented upon a print trigger input, resulting in CNT0=0 (COLUMN0=0) and CNT1=0 (COLUMN1=0).

(a) For the 0th nozzle (the top nozzle) and the 1st nozzle (second from the top nozzle) Since the counter 607 has not yet been incremented at this stage, SCNT0=0, and the multiplexer 611 selects the input B (CNT1/: inverted CNT1 (=1)). By this, the least significant bit in the address of the memory 602 becomes (1), selecting "A5, A6, A7 and A8" in FIG. 14B. At this stage, since the input (S) of the multiplexers 603A to 603D is "0", input B is selected, and the multiplexers 604A and 604B respectively select "A7" for bit 1 and "A8" for bit 0 which are then outputted to the 64-bit latch 605. At this stage, since an output of the decoder 608 is "0", "A7" is set to the latch corresponding to the 0th nozzle (the top nozzle) of the 64-bit latch, and "A8" is set to the latch corresponding to the subsequent 1st nozzle.

(b) For the 2nd nozzle (third from the top nozzle) and the 3rd nozzle (fourth from the top nozzle)

Figure 14C:
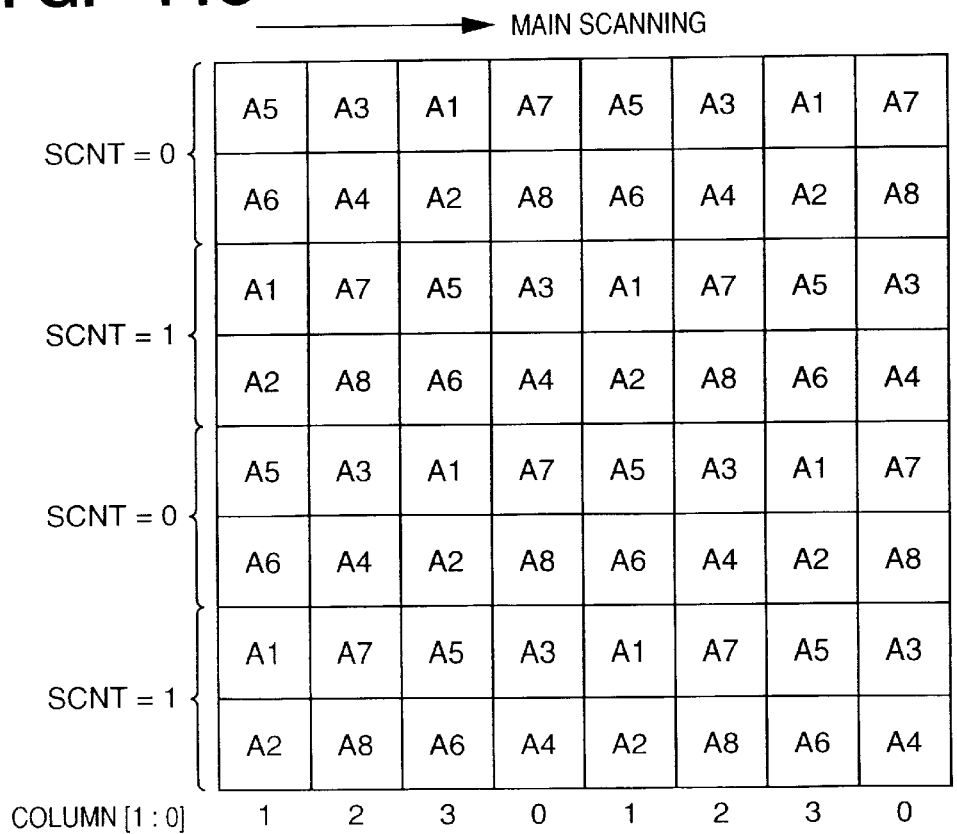

Since a shift clock (SCLK) is outputted, the counter 607 is incremented by 1 and the input (S) of the multiplexer 611 becomes "1", and the input A (CNT1=0) is selected this time. Accordingly, the least significant bit in the address of the memory 602 becomes (0), selecting "A1, A2, A3 and A4" in FIG. 14B. At this stage, since the input (S) of the multiplexers 603A to 603D is "0", input B is selected, and the multiplexers 604A and 604B respectively select "A3" for bit 1 and "A4" for bit 0 which are then outputted to the 64-bit latch 605. At this stage, since an output of the decoder 608 is "1", "A3" is set to the latch corresponding to the 3rd nozzle from the top of the 64-bit latch, and "A4" is set to the latch corresponding to the 4th nozzle (See FIG. 14C).

As apparent from the foregoing description, in the drive data transfer circuit 222 in FIG. 6, the same pattern is always read out for the same multivalued data (see FIGS. 12B and 13B). However, in the drive data transfer circuit 222a shown in FIG. 11, different patterns can be read even for the same multivalued data, in accordance with the position of the data in the nozzle-array direction.

Note that in the above-described first and second embodiments, a memory for 128 words each word having 4 bits is used for the memory 602. However, these numbers base upon the multivalued data (300×300 dpi, quaternary value, 16 levels of tone); thus, the present invention is not limited to these numbers. Moreover, the number of stages of the shift register bases upon the number of nozzles of the printhead; thus, these values do not relate to the essence of the present invention.

Furthermore, the above-described embodiment is adaptive to various data conversion by changing memory contents of the memory 602; thus, it is advantageous in terms of expansibility.

Third Embodiment

Figure 15:
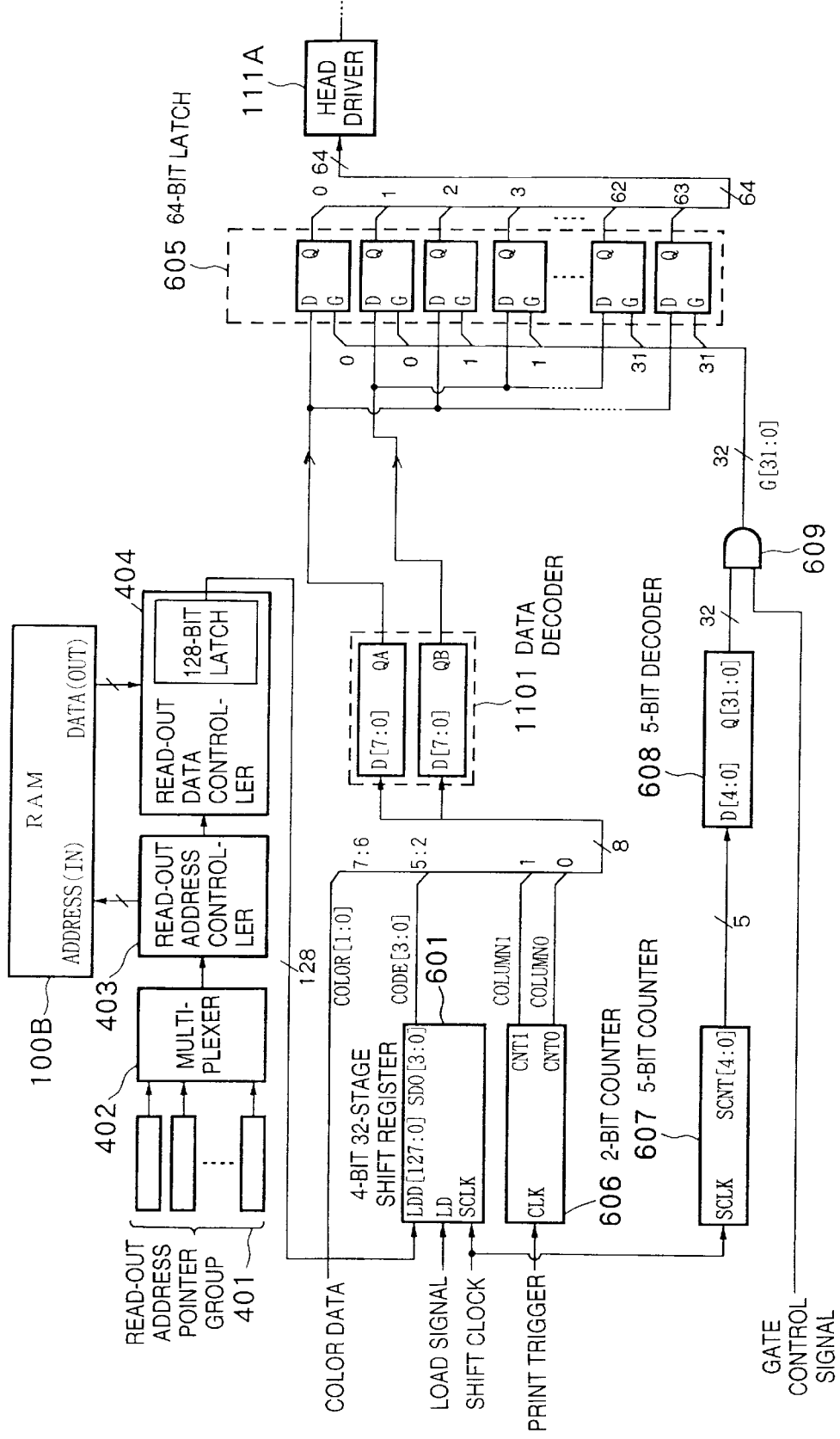
FIG. 15 is a block diagram showing a circuit structure of a drive data transfer circuit according to the third embodiment of the present invention.

FIG. 15 is a block diagram showing a structure of a drive data transfer circuit 222b according to the third embodiment of the present invention. Components identical to those in the structures shown in FIGS. 6 and 11 will be referred by the same reference numerals and description thereof will be omitted.

In the drive data transfer circuit 222b in FIG. 15, a data decoder 1101 is used in place of the aforementioned memory 602, multiplexers 603A to 603D, 604A and 604B. Data inputted to the data decoder 1101 is 8 bits. In the lower two bits of the 8 bits, the 2-bit outputs COLUMN0 and COLUMN1 of the 2-bit counter 606, counting print triggers, are inputted.

Figure 16:
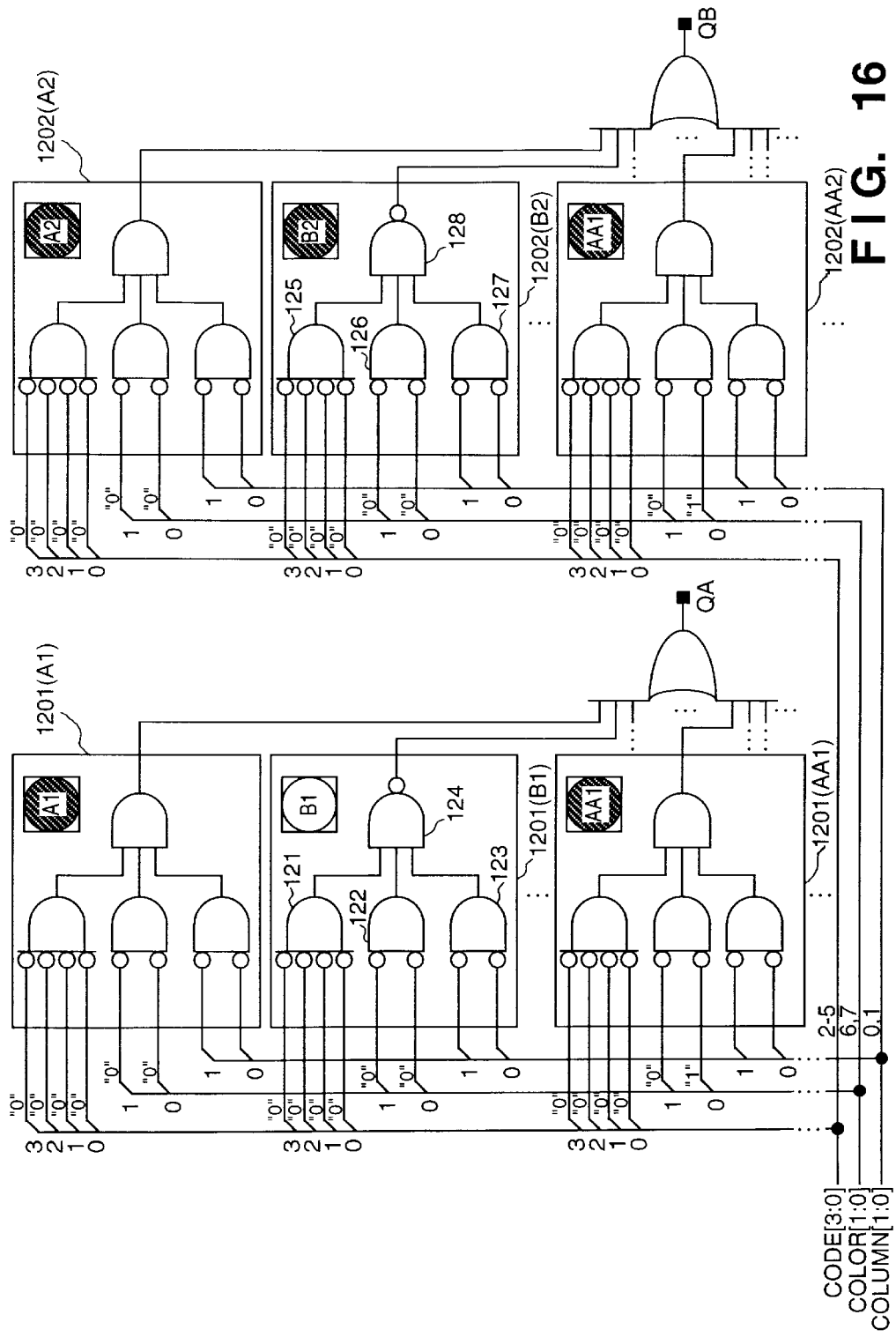
FIG. 16 is a block diagram showing a structure of a data decoder according to the third embodiment of the present invention.

FIG. 16 is a block diagram showing a circuit structure of the data decoder 1101. Note that also in the third embodiment, binary data having resolution of 600×1200 dpi is generated based upon the 4-bit multivalued data (CODE [3:0]) having resolution of 300×300 dpi shown in FIG. 4. In addition, similar to the foregoing description, binary data generated based on CODE[3:0] is different for each color of the C, M, Y and K.

The third embodiment employs the data decoder 1101 structured by the combined circuit of AND gates, OR gates or the like as the means for generating binary data, in place of the memory 602 used in the first and second embodiments. 8-bit data consisting of COLOR[1:0], CODE[3:0], COLUMN[1:0] are supplied to the data decoder 1101, and an output of the data decoder 1101 is stored in the aforementioned 64-bit latch 605.

Assume the case of COLOR[1:0]=0h (cyan), CODE [3:0]=1h and COLUMN[1:0]=0h in FIG. 16. The initial generated data having resolution of 600×1200 dpi is "B1 (no ink discharge) and B2 (ink discharge)" as has been described above with reference to FIG. 5. Circuits 1201 (B1) and 1202 (B2) shown in FIG. 16 are combined circuits respectively corresponding to "B1 " and "B2" of the pattern B. Since "B1 " is "○" (no ink discharge) and "B2" is "●" (ink discharge) according to FIG. 5, outputs of the circuits 1201 (B1) and 1202 (B2) are respectively "0" and "1". In other words, in the circuit 1201 (B1), since outputs of NOR circuits 122 and 123 are both in the high level, and an output of a 4-inputs AND circuit 121 (3 inputs are false) is in the high level, an output of an NAND circuit 124 becomes low level. In the circuit 1202 (B2), since all outputs of circuits 125 to 127 are in the high level, the output of the AND circuit 128 becomes high level. At this stage, since outputs of other combined circuits are always "0", outputs QA and QB of the data decoder 101 are respectively "0" and "1" since these outputs are a logical OR of the combined circuits. As shown in FIG. 16, though other circuits 1201 (A1), 1202 (A2), 1201 (AA1), 1202 (AA2) and the like are provided in the data decoder 1101, the explanation of the operation of the circuits is omitted.

Note that since the timing chart, showing changes in signals of the drive data transfer circuit 222b according to the third embodiment, is identical to the timing charts in FIGS. 8 and 9, description thereof will be omitted.

In the structure of the drive data transfer circuit 222b according to the third embodiment, output patterns cannot be changed unlike the drive data transfer circuit 222a described in the second embodiment. However, since the drive data transfer circuit 222b does not include the memory 602, the circuit can be made smaller as compared to the circuit of the second embodiment; thus, the structure can be made inexpensively and is extremely advantageous in terms of cost reduction.

Although each of the above-described embodiments takes an ink-jet printer as an example and description has been provided on image processing performed by the ink-jet printer, application of the present invention is not limited to this. The present invention is applicable to a recording apparatus besides those utilizing the ink-jet printing method, or a display apparatus using a liquid crystal display besides that of the above-described printing apparatus.

Particularly among the ink-jet printing methods, the present invention attains excellent effects in a printing apparatus having a printhead utilizing heat energy.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum print medium (sheet) which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a single color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ ink which is solid at room temperature or less, or ink which softens or liquefies at room temperature, or ink which liquefies upon application of a printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

Moreover, the present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As set forth above, according to the above-described embodiments, since resolution conversion and binarization processing can be performed in real time, data transfer speed can be improved and throughput is increased. In addition, since data on which resolution conversion has been performed does not need to be stored, the memory capacity of the RAM 100B can be made small as compared to the conventional printer system's memory. Therefore, an effect of cost reduction is attained. In addition, high precision characteristics of the printhead can be fully utilized.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for performing processing on inputted image data and generating data to be used by an output apparatus, comprising:

transfer means for storing the inputted image data and serially transferring the data in synchronization with a shift clock, wherein the output apparatus outputs an image in synchronism with the shift clock;

conversion means for converting the inputted image data transferred by said transfer means, wherein said conversion means converts image data of low density into image data of high density in two dimensional directions;

count means for counting the shift clock to determine an output position of an image by the output apparatus;

selection means for selecting the data converted by said conversion means in two dimensional directions, plural times, based on a count value counted by said count means; and output means for outputting the data selected by said selection means to the output apparatus.

2. The image processing apparatus according to claim 1, wherein the inputted image data is multivalued data.

3. The image processing apparatus according to claim 1, wherein said conversion means comprises a memory for inputting at least the inputted image data transferred by said transfer means as an address and outputting converted data corresponding to the address; and bit-position change means for changing a position of a bit outputted from the memory.

4. The image processing apparatus according to claim 1, wherein the inputted image data includes data for plural colors, and each of the data for plural colors is multivalued image data.

5. The image processing apparatus according to claim 1, wherein image data converted by said conversion means is pseudo-halftone image data of the inputted image data.

6. The image processing apparatus according to claim 1, wherein said output apparatus is an image forming apparatus, and said selection means selects pixel data in correspondence with a pixel position formed by the image forming apparatus.

7. The image processing apparatus according to claim 1, wherein said output apparatus is a printer and said selection means selects pixel data in correspondence with a pixel position to be printed by a printhead of the printer.

8. The image processing apparatus according to claim 4, wherein said conversion means comprises a decode circuit for generating binary data in accordance with the multivalued image data at least transferred by said transfer means.

9. An image processing method of performing processing on inputted image data and generating data to be used by an output apparatus, comprising:

a transferring step of storing the inputted image data and serially transferring the inputted image data in synchronization with a shift clock, wherein the output apparatus outputs an image in synchronism with the shift clock;

a converting step of converting the inputted image data transferred in said transferring step, wherein the inputted image data of low density is converted into image data of high density in two dimensional directions;

a counting step of counting the shift clock to determine an output position of an image by the output apparatus;

a selection step of selecting the data converted in said converting step in two dimensional directions, plural times, based on a count value obtained in said counting step; and an outputting step of outputting the data selected in said selection step to the output apparatus.

10. The image processing method according to claim 9, wherein the inputted image data is multivalued data.

11. The image processing method according to claim 9, wherein the inputted image data includes data for plural colors, and each of the data for plural colors is multivalued image data.

12. The image processing method according to claim 9, wherein image data converted in said converting step is pseudo-halftone image data of the inputted image data.

13. The image processing method according to claim 9, wherein said output apparatus is an image forming apparatus, and in said selection step, pixel data is selected in correspondence with a pixel position formed by the image forming apparatus.

14. The image processing method according to claim 9, wherein said output apparatus is a printer and in said selection step, pixel data is selected in correspondence with a pixel position to be printed by a printhead of the printer.

15. An image forming apparatus for forming an image by performing processing on inputted image data, comprising:

transfer means for storing the inputted image data and serially transferring the data in synchronization with a shift clock, wherein the image forming apparatus forms an image in synchronism with the shift clock;

conversion means for converting the inputted image data transferred by said transfer means, wherein said conversion means converts image data of low density into image data of high density in two dimensional directions;

count means for counting the shift clock to determine an image forming Position by the image forming apparatus;

selection means for selecting the data converted by said conversion means in two dimensional directions, plural times, based on a count value counted by said count means; and image forming means for forming an image based on the data selected by said selection means.

16. The image forming apparatus according to claim 15, wherein the inputted image data is multivalued data.

17. The image forming apparatus according to claim 15, wherein said conversion means comprises a memory for inputting at least the inputted image data transferred by said transfer means as an address and outputting converted data corresponding to the address; and bit-position change means for changing a position of a bit outputted from the memory.

18. The image forming apparatus according to claim 15, wherein the inputted image data includes data for plural colors, and each of the data for plural colors is multivalued image data.

19. The image forming apparatus according to claim 15, wherein the converted data is pseudo-halftone image data of the inputted image data.

20. The image forming apparatus according to claim 15, wherein said image forming apparatus is a printer and said selection means selects pixel data in correspondence with a pixel position to be printed by a printhead of the printer.

21. The image forming apparatus according to claim 15, wherein said conversion means comprises a decode circuit for generating binary data in accordance with the inputted image data at least transferred by said transferring means.

22. The image forming apparatus according to claim 20, wherein the printhead of the printer is an ink-jet head which discharges ink by utilizing heat energy.

23. An image processing apparatus for processing input image data and generating data used by an output apparatus having a plurality of recording elements being arranged in a first direction, the apparatus comprising:

transfer means for storing the input image data and serially transferring the input image data in synchronization with a shift clock, wherein the output apparatus outputs an image in synchronism with the shift clock;

conversion means for converting the input image data transferred by said transfer means, wherein said conversion means converts image data of low density into image data of high density in a second direction being different from the first direction;

count means for counting the shift clock to determine an output position of an image by the output apparatus;

selection means for selecting the data converted in the second direction by said conversion means, plural times, based on a count value counted by said count means; and output means for outputting the data selected by said selection means to the output apparatus.

24. An image processing method of processing input image data and generating data used by an output apparatus having a plurality of recording elements being arranged in a first direction, the method comprising:

a transfer step of storing the input image data and serially transferring the input image data in synchronization with a shift clock, wherein the output apparatus outputs an image in synchronism with the shift clock;

a conversion step of converting the input image data transferred by said transfer step, wherein said conversion step converts image data of low density into image data of high density in a second direction being different from the first direction;

a count step of counting the shift clock to determine an output position of an image by the output apparatus;

a selection step of selecting the data converted in the second direction by said conversion step, plural times, based on a count value counted by said count step; and an output step of outputting the data selected by said selection step to the output apparatus.

25. A storage medium storing a program for causing a computer to perform an image processing method of processing input image data and generating data used by an output apparatus having a plurality of recording elements being arranged in a first direction, the method comprising:

a transfer step of storing the input image data and serially transferring the input image data in synchronization with a shift clock, wherein the output apparatus outputs an image in synchronism with the shift clock;

a conversion step of converting the input image data transferred by said transfer step, wherein said conversion step converts image data of low density into image data of high density in a second direction being different from the first direction;

a count step of counting the shift clock to determine an output position of an image by the output apparatus;

a selection step of selecting the data converted in the second direction by said conversion step, plural times, based on a count value counted by said count step; and an output step of outputting the data selected by said selection to the output apparatus.

* * * * *

UNITED STATES PATENT AND TRADEMARK OFFICE
CERTIFICATE OF CORRECTION

PATENT NO. : 6,108,102

DATED : August 22, 2000

INVENTOR(S) : HIDEKI TANAKA ET AL.                Page 1 of 2

It is certified that error appears in the above-identified patent and that said Letters Patent is hereby corrected as shown below:

IN THE COVER PAGE [56] References Cited:

"06187405" should read --6-187405--;
"07235878" should read --7-235878--;

Col. 5, line 3, "driver 11A." should read --drive 111A.--;
line 11, "these" should read --the--;
line 27, "4 bits X 32 128 bits)" should read --4 bits X 32 = 128 bits)--;
line 62, "2h," dhould read --2h,...,--;

Col. 12, line 66, "Since" should read --¶Since--;

Col. 13, line 35, "words" should read --words,--;
line 36, "bits" should read --bits,--;
line 37, "base" should read --are based--;

Col. 17, line 25, "two dimensional" should read --two-dimensional--;
line 30, "two dimensional" should read --two-dimensional--;

UNITED STATES PATENT AND TRADEMARK OFFICE
CERTIFICATE OF CORRECTION

PATENT NO. : 6,108,102

DATED : August 22, 2000

INVENTOR(S) : HIDEKI TANAKA ET AL.

It is certified that error appears in the above-identified patent and that said Letters Patent is hereby corrected as shown below:

Col. 18, line 9, "two dimensional" should read --two-dimensional--;
line 12, "two dimensional" should read --two-dimensional--;
line 46, "Position" should read --position--.

Signed and Sealed this

Twenty-fourth Day of April, 2001

*Attest:*

*Attesting Officer*

NICHOLAS P. GODICI

*Acting Director of the United States Patent and Trademark Office*